(12) United States Patent
Khufu Ragheb Rezk et al.

(10) Patent No.: US 8,365,032 B2
(45) Date of Patent: Jan. 29, 2013

(54) SYSTEM AND METHOD FOR MULTIPLE INPUT, MULTIPLE OUTPUT (MIMO) COMMUNICATIONS

(75) Inventors: Meriam Khufu Ragheb Rezk, Stanford, CA (US); Cornelius van Rensburg, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 553 days.

(21) Appl. No.: 12/624,264

(22) Filed: Nov. 23, 2009

(65) Prior Publication Data

US 2011/0126067 A1    May 26, 2011

(51) Int. Cl.
*G06F 11/00* (2006.01)
(52) U.S. Cl. .......................... 714/748; 375/262
(58) Field of Classification Search .................. None
See application file for complete search history.

(56) References Cited

U.S. PATENT DOCUMENTS

| 7,912,141 | B2 | 3/2011 | She et al. |
| 8,238,461 | B2 * | 8/2012 | Zhou et al. ............... 375/267 |
| 2011/0142117 | A1 | 6/2011 | Hua et al. |

FOREIGN PATENT DOCUMENTS

| CN | 101166052 A | 4/2008 |
| CN | 101330361 A | 12/2008 |
| WO | WO 2009/075662 A1 | 6/2009 |

OTHER PUBLICATIONS

Rezk et al., "Performance of a MIMO Receiver Using Joint Channel-Symbol Estimation in the Presence of Channel Errors", 2010, IEEE, pp. 1488-1492.*

Tarokh, V., et al., "Space-Time Codes for High Data Rate Wireless Communication: Performance Criterion and Code Construction," IEEE Transactions on Information Theory, Mar. 1998, pp. 744-765, vol. 44, No. 2.

Belfiore, J.-C., et al., "The Golden Code: A 2× 2 Full-Rate Space-Time Code with Nonvanishing Determinants," IEEE Transactions on Information Theory, Apr. 2005, pp. 1432-1436, vol. 51, No. 4.

(Continued)

*Primary Examiner* — Michael Maskulinski
(74) *Attorney, Agent, or Firm* — Slater & Matsil, L.L.P.

(57) ABSTRACT

A system and method for MIMO communications is provided. A method includes receiving a data block of P matrices from a transmitter, and determining if operating conditions are met. The method also includes if operating conditions are not met, computing a test position, selecting a codeword based on the test position, and computing a metric. The metric may then be compared with an error radius to determine a validity of the codeword. If the codeword is invalid, another codeword is selected. If the codeword is valid, then the codeword is stored if all matrices have been evaluated, else another matrix is selected for evaluation. If matrices earlier in the data block have untested codewords while all codewords for a matrix being evaluated have been tested, backtracking may be performed. After the codewords for the data block have been found, the stored data may be outputted and processed.

19 Claims, 15 Drawing Sheets

OTHER PUBLICATIONS

Hassibi, B., et al., "On the Sphere-Decoding Algorithm I. Expected Complexity," IEEE Transactions on Signal Processing, Aug. 2005, pp. 2806-2818, vol. 53, No. 8.

Ma, W.-K., et al., "Blind ML Detection of Orthogonal Space-Time Block Codes: Efficient High-Performance Implementations," IEEE Transactions on Signal Processing, Feb. 2006, pp. 738-751, vol. 54, No. 2.

Xu, W., et al., "On Exact Maximum-Likelihood Detection for Non-Coherence MIMO Wireless Systems: A Branch-Estimate-Bound Optimization Framework," ISIT, Electrical Engineering Department, California Institute of Technology, Jul. 6-11, 2008, 2017-2021, IEEE, Toronto, Canada.

Rezk, M., et al., "Blind MIMO Using the Golden Code," Department of Electrical Engineering, University of California, Santa Cruz, CA, Nov. 2009, 5 pages.

Rezk, M., et al., "Joint Channel-Symbol Estimation for High-Performance Differential MIMO," Department of Electrical Engineering, University of California, Santa Cruz, CA, 2008, 6 pages.

International Search Report and the Written Opinion of the International Searching Authority, International Application No. PCT/CN2010/078980, Applicant: Huawei Technologies Co., LTD., Jan. 27, 2011, 9 pages.

* cited by examiner

SYSTEM AND METHOD FOR MULTIPLE INPUT, MULTIPLE OUTPUT (MIMO) COMMUNICATIONS

TECHNICAL FIELD

The present invention relates generally to wireless communications, and more particularly to a system and method for MIMO communications.

BACKGROUND

Typically, multiple input, multiple output (MIMO) communications systems make use of space-time coding techniques to enhance the capacity of a communications link and/or to improve its reliability. Furthermore, perfect space-time block codes, such as golden codes for two-transmit antenna MIMO communications systems, were introduced as an energy efficient linear dispersion space-time block code with non-vanishing determinants achieving full-rate and full-diversity while out performing previously known codes.

In general, MIMO communications systems are coherent communications systems that rely on estimating a communications channel at a receiver. Usually, this may be performed by transmitting pilot signals (or sequences) that enable channel estimation. However, the transmission of pilot signals reduces the useful capacity of the communications system. In cases such as high mobility situations where fast fading makes it necessary to frequently re-estimate the communications channel, the reduction in the useful capacity of the communications system by transmitting pilot signals is especially acute.

A technique that may help to reduce the pilot signal overhead problem is to use differential encoding of transmissions. The use of differential encoding eliminates the need for estimating the communications channel at the cost of increased required signal-to-noise ratio (SNR). Another technique that may help to reduce the pilot signal overhead problem is to use blind MIMO, wherein neither the communications channel nor the transmitted codewords are known to the receiver. Blind detection may then be used to recover the transmitted codewords.

SUMMARY OF THE INVENTION

These and other problems are generally solved or circumvented, and technical advantages are generally achieved, by embodiments of a system and method for MIMO communications.

In accordance with an embodiment, a method for receiver operation is provided. The method includes a) receiving a data block from a transmitter (the data block including P matrices, where P is a positive integer), b) determining whether or not operating conditions are met, and c) if operating conditions are not met, c1) computing a test position, c2) selecting a codeword based on the test position, and c3) computing a metric based on matrices of the data block corresponding to matrix indices less than or equal to the matrix index and a solution set of codewords selected for matrices of the data block corresponding to matrix indices less than or equal to the matrix index. The method also includes c4) if the metric is greater than an error constraint, repeating the steps b) and c), and c5) if the metric is not greater than the error constraint, c5a) if all test positions have been evaluated, saving a codeword indexed by the codeword index in the solution set, updating the error constraint, and repeating the steps b) and c). The method further includes c5b) if not all test positions have been evaluated, updating the matrix index to a next matrix, and repeating the steps b) and c). The method additionally includes d) if operating conditions are met, outputting the solution set, and processing the outputted solution set. The test position includes a matrix index to a matrix in the data block and a codeword index to a codeword in a set of codewords associated with the matrix corresponding by the matrix index.

In accordance with another embodiment, a method for receiver operation is provided. The method includes a) receiving a data block including a plurality of matrices from a transmitter, and b) determining whether or not operating conditions are met. The method also includes c) if operating conditions are not met, c1) computing a level index to a matrix in the data block and a leaf index to a codeword in a set of codewords, c2) selecting a codeword based on the level index and the leaf index, and c3) computing a metric based on matrices of the data block corresponding to level indices lower than and equal to the level index and a solution set of codewords for matrices of the data block corresponding to level indices lower than and equal to the matrix index. The method further includes c4) if the metric is greater than an error constraint, repeating the steps b) and c), and c5) if the metric is not greater than the error constraint, c5a) if all matrices have been evaluated, saving a codeword corresponding to the leaf index associated with the level index in the solution set, updating the error constraint, and repeating the steps b) and c). The method additionally includes c5b) if not all matrices have been evaluated, updating the level index, and repeating the steps b) and c). The method includes d) if operating conditions are met, outputting the solution set, and processing the outputted solution set. The leaf index is associated with the level index.

In accordance with another embodiment, a receiver is provided. The receiver includes a plurality of receive antennas, a plurality of receive circuits, each receive circuit coupled to a receive antenna, a detector coupled to the plurality of receive circuits, and a decoder coupled to the detector. The detector detects codewords present in a block of received data. The received data includes a plurality of matrices provided by the plurality of receive circuits over plurality of transmission intervals by choosing a best codeword out of a set of codewords for each matrix in the block of received data based on an adjustable error constraint. The adjustable error constraint is relaxed or tightened based on a quality of codewords chosen, and the detector backtracks to previously evaluated matrices if not all codewords in the set of codeword for each matrix has been tested. The decoder reconstructs transmitted data from the codewords detected in the block of received data.

An advantage of an embodiment is that pilots are not transmitted, which may significantly reduce communications overhead, especially in situations with fast fading, such as high mobility. Reducing communications overhead may help to increase communications channel capacity.

A further advantage of an embodiment is that computational requirements are significantly lower than brute force search techniques, which may reduce computational resource requirements as well as power requirements.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO communications system that makes use of either differential encoding of transmissions or blind MIMO to reduce or eliminate the need for transmitting pilots to increase communications system capacity.

Whether differential encoding or blind MIMO is used, the performance at a MIMO receiver may be improved by jointly estimating the transmitted symbols and the unknown communications channel for a block of received data. As the size of the block (i.e., the number of received codewords, P,) increases, the performance may approach that of a MIMO communications system with perfect communications channel knowledge. However, increased block size also increases the computational complexity of a detector used to detect the transmitted symbols. Therefore, there may be a tradeoff between transmitted symbol detection performance and computational complexity.

Optimal detectors have been proposed based on a generalized likelihood ratio detection approach. However, these detectors require a brute force search over all possible transmitted sequences of codewords within a block of received data. The brute force search may be unfeasible for even blocks of moderate size and small constellations.

To reduce computational requirements, a search efficient Branch-Estimate-Bound (BEB) algorithm for spatially multiplexed MIMO may be modified for use with blind MIMO and joint block differential encoding. The modified BEB algorithm has been found to provide a significant reduction in computational complexity, especially in high SNR situations. To help further reduce computational complexity in low SNR situations, a further modification to the BEB algorithm that reduces computational complexity in low SNR situations is also provided.

Figure 1A:
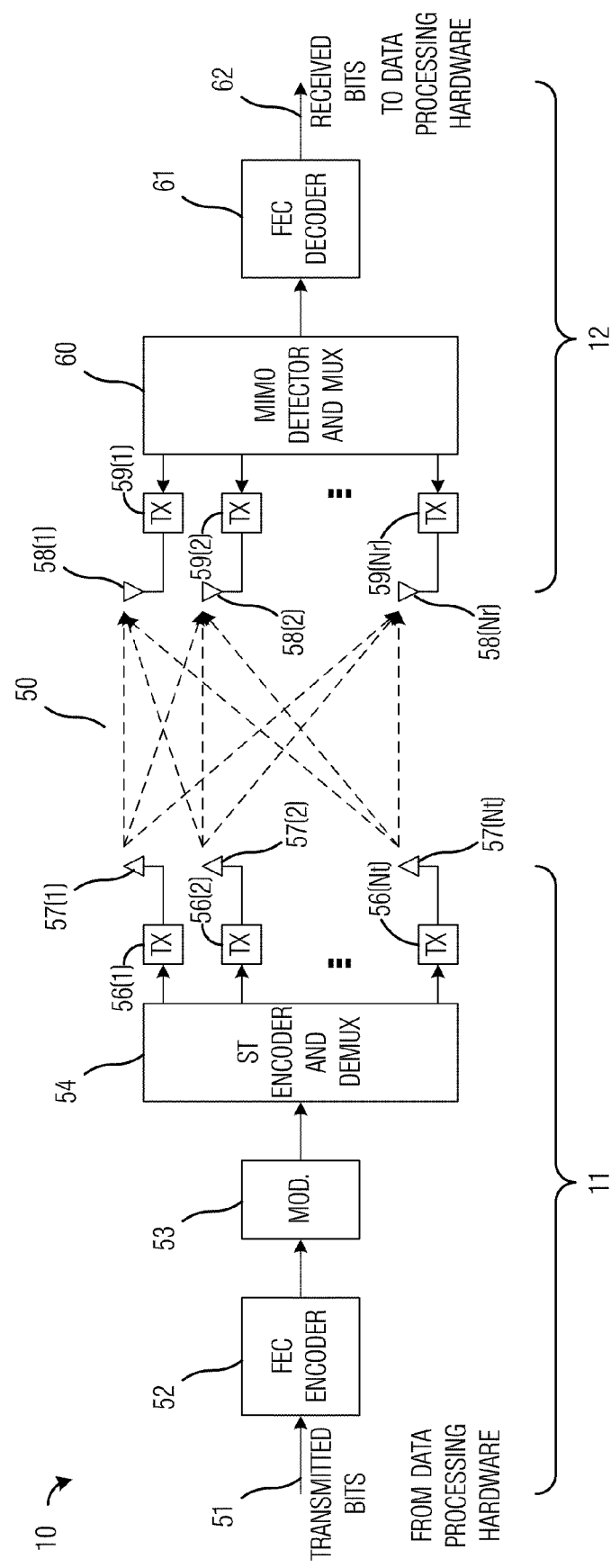
FIG. 1a is a diagram of a MIMO communications system.

FIG. 1a illustrates a MIMO communications system 10. MIMO communications system includes a transmitter 11 with Nt transmit antennas (shown as antennas 57(1) through antennas 57(Nt)) and a receiver 12 with Nr receive antennas (shown as antennas 58(1) through antennas 58(Nt)). Received data at the Nr received antennas may be expressed as:

$$Y[p]=HX[p]+V[p], \quad (1)$$

where H is an Nr×Nt channel matrix whose elements represent the channel coefficients between each transmit-receive antenna pair, X[p] is the Nt×N transmitted codeword during a p-th transmission interval where N is the number of time slots needed to transmit each codeword, Y[p] is the Nr×N corresponding received data matrix, and V[p] is an Nr×N matrix whose elements represent the additive noise terms at each receive antenna at each time slot.

Transmitted bits 51 from data processing hardware, such as a processor, a data input, a user interface, and so forth, may be passed through a forward error correction (FEC) encoder 52 where an error correction code may be added to transmitted bits. A modulator 53 may be used to modulate the output of FEC encoder 52 (transmitted bits 51 with error correction code). Modulator 53 may produce modulated symbols after the output of FEC encoder 52. A space-time encoder and demultiplexer 54 may apply space-time encoding and demultiplex the information symbols into Nt×N transmitted codeword matrices (X[p]). The transmitted codeword matrices X[p] may be appropriately scaled to account for an available transmit power such that:

$$\text{trace}(X[p]X[p]^H) = P_t N_t N, \quad (2)$$

where Pt is an average total transmit power per antenna, and trace(.) is a function that returns a sum of diagonal elements of its argument.

For discussion purposes, golden codewords are used. However, the embodiments may be applicable to any codeword. Therefore, the discussion of golden codewords should not be construed as being limiting to either the scope or the spirit of the embodiments.

For golden codewords, Nt=N=2 and for each transmission, a 4×1 vector s[p] of constellation symbols at the output of modulator 53 is expressible as:

$$s[p] = [s1[p], s2[p], s3[p], s4[p]].$$

The 4×1 vector s[p] may be encoded by space-time encoder and demultiplexer 54 to provide golden codewords of the form:

$$X[p] = \frac{1}{\sqrt{5}} \begin{bmatrix} \alpha(s_1[p] + s_2[p]\theta) & \alpha(s_3[p] + s_4[p]\theta) \\ \gamma\overline{\alpha}(s_3[p] + s_4[p]\overline{\theta}) & \overline{\alpha}(s_1[p] + s_2[p]\overline{\theta}) \end{bmatrix}, \quad (3)$$

where $$\gamma = i, \quad \theta = \frac{1 + \sqrt{5}}{2}, \quad \alpha = 1 + i(1 - \theta), \quad \overline{\theta} = 1 - \theta, \text{ and}$$

$$\overline{\alpha} = 1 + i(1 - \overline{\theta}).$$

The golden code generating matrix C may be expressed as:

$$C = \frac{1}{\sqrt{5}} \begin{bmatrix} \alpha & \alpha\theta & 0 & 0 \\ 0 & 0 & \gamma\overline{\alpha} & \gamma\overline{\alpha}\overline{\theta} \\ 0 & 0 & \alpha & \alpha\theta \\ \overline{\alpha} & \overline{\alpha}\overline{\theta} & 0 & 0 \end{bmatrix}. \quad (4)$$

Therefore, C and X[p] may be related by relationship:

$$X[p] = \text{reshape}(Cs[p], N_t, N),$$

where reshape(Cs[p], Nt, N) is a function with three inputs (Cs[p], Nt, and N). A first input is a vector Cs[p], while a second input Nt and a third input N are both positive scalar integers whose product must be equal to the dimension of the first input. reshape(Cs[p], Nt, N) orders the elements of Cs[p] into an Nt×N matrix, which is the output of reshape(Cs[p], Nt, N).

Each of the Nt available streams at an output of space-time encoder and demultiplexer 54 may then be provided to a transmit circuit 56 that transmits a corresponding stream using a Tx antenna 57. Transmit circuit 56 may be used to perform radio frequency (RF) processing on the streams, such as digital-to-analog conversion, filtering, amplifying, and so forth.

After passing through the communications channel H 50, a stream received at each of the Nr receive antennas 58 may be passed to a receive circuit 59. Receive circuit 59 may be used to perform RF processing on the streams, such as analog-to-digital conversion, filtering, amplifying, and so on. Outputs from each of the Nr receive circuits may provide the Nr×N received data matrix Y[p]. A MIMO detector and multiplexer block 60 may be used to process the received data matrix Y[p] using an algorithm, such as the modified BEB algorithms for detection with blind MIMO detection and joint block differential MIMO detection. The modified BEB algorithms may be implemented in a digital signal processor, a general purpose processor, a custom design integrated circuit, or so forth. Output of MIMO detector and multiplexer block 60 may then undergo FEC decoding in FEC decoder 61 to reconstruct received bits 62 from the detected codewords. Received bits 62 may then be passed to data processing hardware for processing and/or use. For example, received bits 62 may be passed to a processor for additional processing and may be used to adjust configuration and/or setting of receiver 12. Received bits 62 may also be provided to a user of receiver 12, for example, in the form of text, data, images, music, and so forth.

Figure 1B:
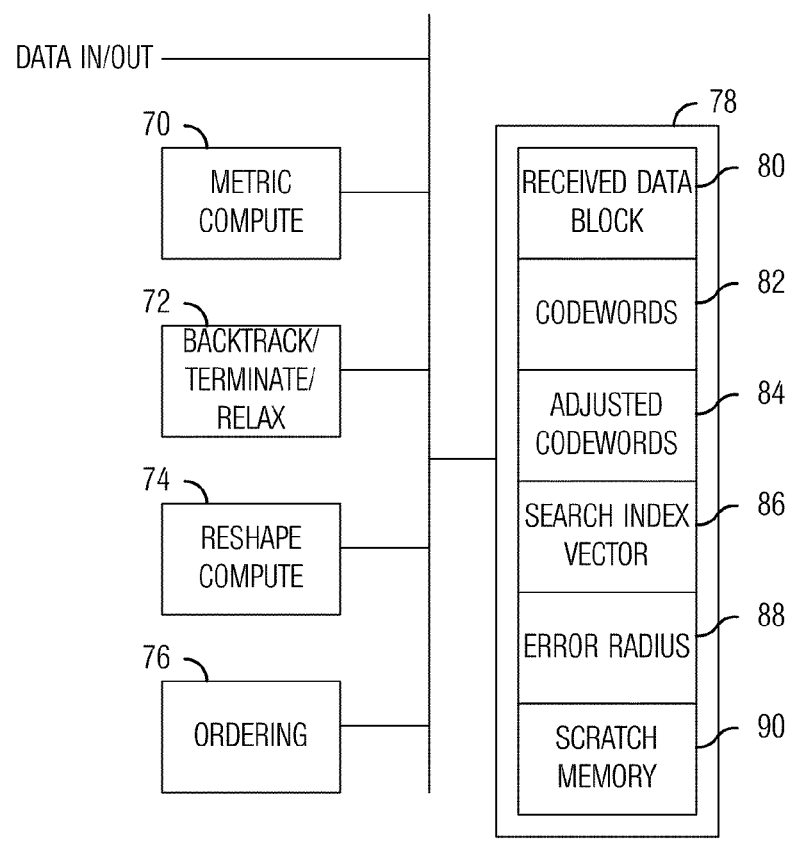
FIG. 1b is a diagram of a detailed view of a portion of MIMO detector and multiplexer block.

FIG. 1b illustrates a detailed view of a portion of MIMO detector and multiplexer block 60. As shown in FIG. 1b, portions of MIMO detector and multiplexer block 60 used in detection of received data symbols are highlighted. MIMO detector and multiplexer block 60 includes a metric compute unit 70 that may be used to compute a quality metric, such as least square error (LSE), for a selected codeword and a received data matrix of a received data block. Metric compute unit 70 may be able to provide a quantitative measurement of how close the selected codeword is to the received data matrix.

MIMO detector and multiplexer block 60 also includes a backtrack/terminate/relax condition unit 72 that may be used to reevaluate previously evaluated received data matrices to determine if they are candidates for reevaluation, as well as evaluating terminating conditions for terminating detecting codewords and/or relaxation of an error radius used to evaluate the codewords. For example, backtrack/terminate/relax condition unit 72 may select a received data matrix for reevaluation if not all codewords have been evaluated for the received data matrix. Furthermore, if all codewords for each received data matrix have been tested, then detecting codewords may terminate. However, if none of the codewords tested were of adequate quality (sufficiently close to the received data matrix), then backtrack/terminate/relax condition unit 72 may need to relax the error radius to enable the selection of a codeword.

MIMO detector and multiplexer block 60 also includes a reshape compute unit 74 that may be used to order elements of an input vector (first input) into a matrix of dimension Nt×N (second and third inputs). An ordering unit 76 may be used to order the received data block. For example, the received data block may be ordered in descending order based on a Frobenius norm of individual received data matrices. The ordering of the received data block may help to reduce computation complexity, especially for low SNR scenarios and/or large block sizes.

A memory 78 may be used to store information and data as MIMO detector and multiplexer block 60 operates on the received data block. Memory 78 may be used to store the received data block (received data block store 80), a set of codewords (codewords store 82), adjusted codewords (adjusted codewords store 84), search index vector (search index vector store 86), error radius (error radius store 88), and so forth. Additionally, memory 78 may also include a scratch memory store 90 that may be used to store temporary variables, data, intermediate values, and so forth, computed while MIMO detector and multiplexer block 60 is operating on the received data block.

If the communications channel is perfectly known at the receiver, then MIMO detector and multiplexer block 60 may implement a known optimal algorithm, maximum likelihood (ML) detection, expressible as:

$$\hat{X}[p] = \underset{\{X_i\}}{\operatorname{argmin}} \|Y[p] - HX_i\|^2, \quad (5)$$

where $\{X_i\}$ represents a set of all possible transmitted codewords. ML detection may be implemented using efficient digital signal processing search algorithms, such as sphere decoding.

However, in practice, the communications channel is not perfectly known at the receiver and may be estimated through the use of techniques such as measuring transmitted pilots at the expense of reduced system capacity. A reduction in system capacity may be exaggerated in situations that are rapidly time varying.

As discussed previously, in such situations, blind MIMO detection or joint block differential MIMO detection may be used. When blind MIMO or joint block differential MIMO detection is used, MIMO detector and multiplexer block 60 may be used to process a block of received data to perform blind MIMO detection or joint block differential MIMO detection through an algorithm, such as the modified BEB algorithms discussed below, that does not rely on prior estimated channel information H.

Blind MIMO detection may be performed using a sequence of P received data matrices of the form:

$$Y_B = [Y[1], Y[2], \ldots Y[p], \ldots Y[P]]. \quad (6)$$

The block of received data matrices of size P may correspond to a block of transmitted matrices:

$$X_B = [X[1], X[2], \ldots X[p], \ldots X[P]]. \quad (7)$$

Therefore, $$Y_B = HX_B + V_B, \quad (8)$$

where $$V_B = [V[1], V[2], \ldots V[p], \ldots V[P]]. \quad (9)$$

It is assumed that the communications channel remains constant for the entirety of a block, i.e., channel coherence time is greater than or equal to an interval of the block of received data matrices of size P.

However, since block $X_B$ is constructed from golden codewords $X[p]$, $p=1, \ldots, P$ and may be unidentifiable and therefore cannot be used for blind MIMO detection. To solve this problem, a modified version of the transmitted block is presented as:

$$X_B = [UX[1], X[2], \ldots X[p], \ldots X[P]], \quad (10)$$

where one of the codewords in the block, e.g., first codeword as in Equation (10), may be pre-multiplied by a unitary matrix U. Although shown in Equation (10) with the first codeword, i.e., X[1] being multiplied by the unitary matrix, any one of the codewords in the block may be multiplied by the unitary matrix. Since the golden code may be classified as an unidentifiable space-time code (like most other square space-time codes), there exists a finite set of matrices $\{Q_m \neq I\}$ which transforms some or all codewords into other codewords. If there exists a matrix Q which transforms the block codeword $X_B$ in Equation (10) into a valid block codeword, it must be one of these matrices. If this were to occur, then $Q_m UX = U\bar{X}$ or $U^H Q_m UX = \bar{X}$. In other words $U^H Q_m U$ must be one of the matrices in the set $\{Q_m \neq I\}$, such as $Q_n$. Therefore, a necessary and sufficient condition for preventing the possibility of ambiguous codewords is to design U so that $$U^H Q_m U \neq Q_n, \forall m, n \quad (11)$$

holds.

For the 2×2 golden code example discussed above, U may be selected as a rotation matrix of the form:

$$U = \begin{bmatrix} -\sin(\theta) & \cos(\theta) \\ \cos(\theta) & \sin(\theta) \end{bmatrix}, \quad (12)$$

where $10 < \theta < 70$, or $110 < \theta < 170$, or $190 < \theta < 260$, or $280 < \theta < 350$ degrees.

The modified version of the transmitted block (Equation (10)) may be strictly identifiable and may be used for blind MIMO detection provided that one bit per real transmission (and two bits per in-phase and quadrature transmissions) is (are) allowed to take care of a scalar ambiguity problem inherent in blind detection.

Using Equation (8) with the modified version of the transmitted block (Equation (10)), blind MIMO detection may be performed by computing:

$$\hat{X}_B = \underset{\{X_{B_i}\}, H}{\operatorname{argmin}} \|Y_B - HX_{B_i}\|^2, \quad (13)$$

where the minimization is performed both over $\{X_{Bi}\}$, a set of all possible transmitted sequences of P consecutive codewords, and over the unknown communications channel coefficients in H. Minimizing first over the unknown channel matrix, H becomes:

$$\hat{H} = Y_B X_{B_i}^H (X_{B_i} X_{B_i}^H)^{-1}. \quad (14)$$

Substituting back into Equation (13), blind MIMO detection becomes:

$$\hat{X}_B = \underset{\{X_{B_i}\}}{\operatorname{argmin}} \|Y_B - Y_B X_{B_i}^H (X_{B_i} X_{B_i}^H)^{-1} X_{B_i}\| \quad (15)$$

$$= \underset{\{X_{B_i}\}}{\operatorname{argmin}} \|Y_B P_{X_{B_i}^H}^\perp\|,$$

where $P_{X_{B_i}^H}^\perp$ is an orthogonal projection matrix defined as:

$$P_{X_{B_i}^H}^\perp = I - X_{B_i}^H (X_{B_i} X_{B_i}^H)^{-1} X_{B_i}. \quad (16)$$

Equation (15) may be referred to as the blind generalized likelihood ratio detector (BGLRD).

In joint block differential MIMO detection, a block consists of P transmitted data matrices $X[1], \ldots, X[P]$. Differential encoding may be performed with respect to a single data matrix within the block, which may be referred to as a pivotal data matrix. The pivotal data matrix may be chosen to be a scaled square unitary matrix. As an example, let the pivotal data matrix be the first matrix in the block, i.e., X[1] is the pivotal data matrix. However, the pivotal data matrix may be chosen to be any matrix in the block. All of the other data matrices (non-pivotal) within the block may be determined by a relationship expressible as:

$$X[p] = X[1] S[p], p=2, \ldots, P, \quad (17)$$

where X[p] is an actual transmitted data matrix during a p-th transmission interval and S[p] is a matrix representing the codewords containing the information symbols. For example, using the golden code, S[p] may be expressed as:

$$S[p] = \frac{1}{\sqrt{5}} \begin{bmatrix} \alpha(s_1[p] + s_2[p]\theta) & \alpha(s_3[p] + s_4[p]\theta) \\ \gamma\bar{\alpha}(s_3[p] + s_4[p]\bar{\theta}) & \bar{\alpha}(s_1[p] + s_2[p]\bar{\theta}) \end{bmatrix}, \quad (18)$$

where $$\gamma = i, \quad \theta = \frac{1+\sqrt{5}}{2}, \alpha = 1 + i(1-\theta), \bar{\theta} = 1-\theta \text{ and}$$

$$\bar{\alpha} = 1 + i(1-\bar{\theta}).$$

The communications channel H may be assumed to be fixed over a transmission interval of the P codewords which must be smaller than the coherence time of the communications channel. The effective data rate using full-rate codes is Nt((P−1)/P) symbols-per-channel-use, which approaches Nt symbols-per-channel-use as P increases.

The received data matrices within a block may be related by:

$$Y[1] = HX[1] + V[1]$$

$$Y[p] = HX[p] + V[p]$$

$$= HX[1]S[p] + V[p]$$

$$= Y[1]S[p] - V[1]S[p] + V[p], p=2, \ldots, P. \quad (20)$$

Neglecting the noise correlation may result in a simpler version of the detector at the cost of a fraction of a dB loss in performance compared to considering noise correlations. The differential receiver may then take the form:

$$\hat{S}[p] = \underset{\{S_i\}}{\operatorname{argmin}} \|Y[p] - Y[0]S_i\|^2, \quad (21)$$

which may require a search over all possible transmitted codewords $\{S_i\}$. The search may be performed efficiently using a sphere decoder.

Rather than using Equation (21) to estimate the transmitted codeword and suffering from approximately 3 dB loss relative to coherent detection when H is perfectly known at the receiver, performance may be improved by applying joint channel-symbol estimation over the block of received data. This technique may be referred to as joint block differential detection or joint differential for short. Joint differential may be expressed as:

$$Y_B = HX_B + V_B = ZS_B + V_B, \quad (22)$$

where $Z = HX[1]$ and $S_B$ is given by:

$$S_B = [I, S[2], \ldots S[p], \ldots S[P]]. \quad (23)$$

To solve Equation (22) for $S_B$, differential generalized likelihood ratio detector (DGLRD), which resembles the BGLRD discussed previously, may be used. In other words, find $$\hat{S}_B = \underset{\{S_{B_i}\}, Z}{\operatorname{argmin}} \|Y_B - ZS_{B_i}\| \quad (24)$$

$$= \underset{\{S_{B_i}\}}{\min} \|Y_B P_{S_{B_i}^H}^\perp\|,$$

with $$P_{S_{B_i}^H}^\perp = I - S_{B_i}^H (S_{B_i} S_{B_i}^H)^{-1} S_{B_i}. \quad (25)$$

As P increases, the performance of the DGLRD approaches that of a coherent MIMO system. However, a brute force search over all possible (P−1)-long sequences of transmitted codewords may be required. Even for moderate values of P, the brute force search may be prohibitive.

As discussed above, carrying out the calculations for the BGLRD in Equation (15) or the DGLRD in Equation (24) requires a brute force search over all possible transmitted codeword sequences. An exhaustive search may not be feasible even for moderate values of P and relatively small constellation size. Additionally, sphere decoding may not be applied using non-orthogonal high-rate codes such as the golden code. The BEB algorithm provides a search efficient solution, but is applicable to joint channel-symbol estimation of a non-coherent spatial multiplexed MIMO system that relies on the transmission of pilots to alleviate identifiability issues of non-coherent detection. Therefore, modifications to the BEB algorithm that allows for a search efficient solution for the BGLRD and the DGLRD discussed above is needed. The modified BEB algorithm may be readily implemented in MIMO detector and multiplexer block 60 of FIG. 1.

Definition of Input Parameters:

$Y_B$ is the received data block as in Equation (6) which is the output of receive circuit 59 (FIG. 1) over P transmission intervals;

P is the number of received data matrices in the received data block $Y_B$ over P transmission intervals to be processed by the modified BEB algorithm implemented in MIMO detector and multiplexer block 60;

The pilot bit(s) b is a single bit in case of real transmissions (e.g., real PAM) and two bits in case of in-phase and quadrature transmission (e.g., QAM). The pilot bit(s) are needed when considering blind MIMO detection and assume for the following descriptions of the modified BEB algorithm that they are included in the first transmitted codeword, X[1], in each transmitted block $X_B$ of size P codewords as in Equation (10);

Nt is the number of transmit antennas;

N is the number of time slots spanned by the space-time codewords used at the transmitter (e.g. using Golden codewords, N=2=number of columns of codeword matrix X[p]) given in Equation (3);

C is the generating matrix of the space-time code used at the transmitter. In simulations presented herein, C is the Golden code generating matrix as defined in Equation (4);

U is the chosen unitary matrix to create the modified block code in Equation (10);

r is the specified search radius of the modified BEB algorithm to which the computed LSE metric will be compared. The search radius is also referred to as an error radius. Once a solution is found, r is updated to the value of the LSE given by that solution. At the beginning, r has to be selected by the user or specified by the communications system. A good choice of r depends on both the SNR and the block size P. This can be chosen by using the probability density function of the sum of the square of the noise terms affecting the system under consideration to compute the value above which most of the noise realizations can be neglected and setting r equal to that value;

Ψ is the set of all possible distinct vectors of modulated symbols, at the output of modulator 53, that may be encoded in each codeword transmission using space-time encoder and demultiplexer 54. Hence, Ψ contains $L = \Omega^K$ vectors where $\Omega$ represents the constellation alphabet and K is the number of symbols in each vector that are encoded in each codeword. For example, considering a BPSK modulator with an alphabet of two symbols such that $\Omega=[-1\ 1]$ and using a space-time code that encodes four symbols in each codeword such as the golden code in Equation (3), then $\Psi$ contains $L=2^4=16$ distinct possible vectors and is given by $$\Psi = \begin{bmatrix} -1 & 1 & -1 & 1 & -1 & 1 & -1 & 1 & -1 & 1 & -1 & 1 & -1 & 1 & -1 & 1 \\ -1 & -1 & 1 & 1 & -1 & -1 & 1 & 1 & -1 & -1 & 1 & 1 & -1 & -1 & 1 & 1 \\ -1 & -1 & -1 & -1 & 1 & 1 & 1 & 1 & -1 & -1 & -1 & -1 & 1 & 1 & 1 & 1 \\ -1 & -1 & -1 & -1 & -1 & -1 & -1 & -1 & 1 & 1 & 1 & 1 & 1 & 1 & 1 & 1 \end{bmatrix} \quad (26)$$

and similarly for higher order constellations.

I is the 1×P index vector which is an all zeros vector at the initialization of the modified BEB algorithm. The entries in I are filled in during the search progress of the modified BEB algorithm. Each entry in I corresponds to the location of a column vector in the set $\Psi$ (or the set $\Psi^r$ defined below when dealing with the pilot bit(s) information in case of blind MIMO detection) which is currently being selected by the modified BEB algorithm as a possible solution for the vector of transmitted symbols corresponding to that entry. For example, I(3)=6 implies that the modified BEB algorithm is currently selecting the 6th column from the left in the set $\Psi$ as a possible solution for the third ($3^{rd}$) transmitted vector of symbols in the block of received data which contains P transmitted vectors (each encoded in a transmitted codeword) and is currently being processed by the algorithm. The notation I for the index vector is not to be confused with the identity matrix.

Definition of the Modified BEB Algorithm Generated Parameters:

$\Psi^r$ is a subset of the set $\Psi$ chosen to account for the knowledge of the pilot bit(s) b in case of blind MIMO detection. The dimension of the set $\Psi^r$ is then $\Omega^K/2$ for real transmissions and $\Omega^K/4$ for in-phase and quadrature transmissions. Considering the example given regarding the set $\Psi$ in Equation (26), since real BPSK transmission is considered then b is a single pilot bit and the subset $\Psi^r$ includes 16/2=8 possible distinct vectors that differ by more than just a sign multiplication, i.e., $$\Psi^r = \begin{bmatrix} -1 & 1 & -1 & 1 & -1 & 1 & -1 & 1 \\ -1 & -1 & 1 & 1 & -1 & -1 & 1 & 1 \\ -1 & -1 & -1 & -1 & 1 & 1 & 1 & 1 \\ -1 & -1 & -1 & -1 & -1 & -1 & -1 & -1 \end{bmatrix}; \quad (27)$$

i is a counter which tracks the search progress of the modified BEB algorithm within the block of size P, i.e., i may take values in the range [1, ..., P] and the value of i reflects the index within the block of size P that is currently being searched by the modified BEB algorithm. Hence, setting i=1 implies that the modified BEB algorithm is searching for a solution for the first transmitted vector of symbols in the block that spans P transmissions. i may also be referred to as a test position when discussing the modified BEB algorithm;

$X_i$ is the selected codeword by the modified BEB algorithm for the i-th location in the block which contains i=1, ..., P codewords. This notation is used with blind MIMO detection;

Similarly, $S_i$ represents the selected codeword by the modified BEB algorithm for the i-th location in the block which contains i=2, ..., P codewords. This notation is used with block joint differential MIMO. Note that the modified BEB algorithm sets $S_1=I$ automatically to account for block joint differential MIMO encoding as described in the background section for the example in Equation (23);

$X_{(i)}$ represents the horizontal concatenation of all the selected codewords by the modified BEB algorithm up to the i-th selected codeword i.e. $X_{(i)}=[UX1, X2, ..., Xi]$. This notation is used with blind MIMO. For the previously discussed example using golden codewords, the first selected codeword has to be pre-multiplied by the chosen unitary matrix U to account for the modified block codes as in Equation (10);

Similarly, $S_{(i)}$ represents the horizontal concatenation of the identity matrix and all the selected codewords by the modified BEB algorithm up to the i-th selected codeword, i.e., $S_{(i)}=[I, S2, ..., Si]$. This notation is used with joint block differential MIMO;

The LSE metric $M_{X(i)}$ is computed for blind MIMO detection using only the information corresponding to $X_{(i)}$, i.e., $$M_{X(i)} = \|Y_{(i)} - Y_{(i)} X_{(i)}^H (X_{(i)} X_{(i)}^H)^{-1} X_{(i)}\|^2, \quad (28)$$

where $Y_{(i)}$ is a subset of $Y_B$ which contains the horizontal concatenation of the 1st to the i-th received data matrices in the block $Y_B$, i.e., $Y_{(i)}=[Y[1], Y[2], ..., Y[i]]$;

Similarly, the LSE metric $M_{S(i)}$ is computed for joint block differential MIMO using only the information in $S_{(i)}$ and the corresponding $Y_{(i)}$, i.e., $$M_{S(i)} = \|Y_{(i)} - Y_{(i)} S_{(i)}^H (S_{(i)} S_{(i)}^H)^{-1} S_{(i)}\|^2. \quad (29)$$

Figure 2:
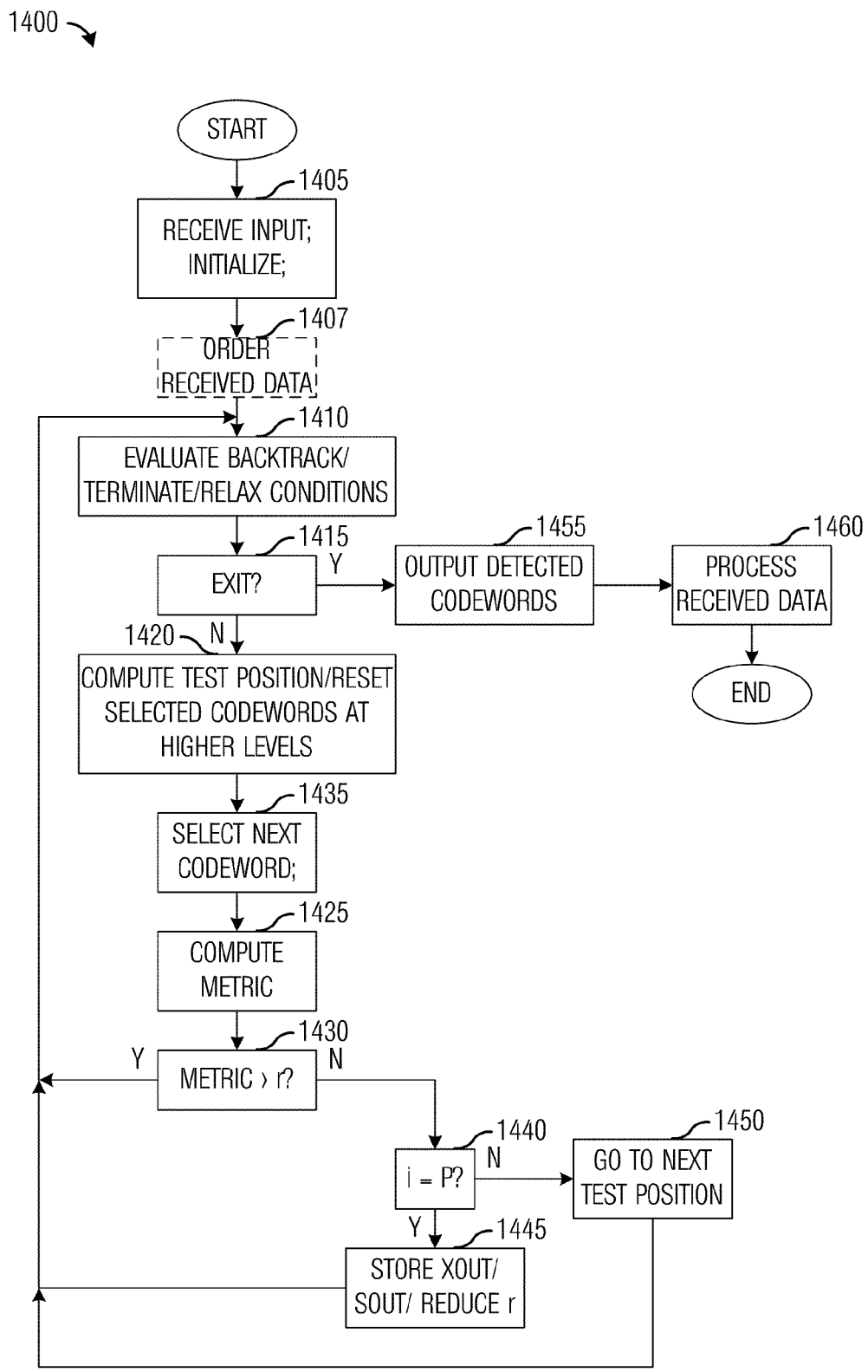
FIG. 2 is a flow diagram of receiver operations.

FIG. 2 illustrates a flow diagram of receiver operations 1400. Receiver operations 1400 may be indicative of operations taking place in a MIMO receiver and in a MIMO detector and multiplexer block 60 of the MIMO receiver while the MIMO receiver is in normal operations.

The discussion focuses on receiver operations for a receiver operating in blind MIMO detection. However, operations for a receiver operating in joint block differential MIMO may be similar. Receiver operations may begin with the MIMO receiver receiving input parameters that include the received data block, size of received data block, error radius, space-time code generating matrix, number of transmit antennas of transmitter, number of time slots spanned by each transmitted codeword, set of all possible vectors of modulated symbols encoded in each transmitted codeword $\Psi$, and so forth. Furthermore, if the MIMO receiver is implementing blind MIMO detection, the MIMO receiver may need to adjust the search for the first codeword using only the set of possible vectors of modulated symbols in the set $\Psi^r$ instead of $\Psi$ to account for the presence of a pilot bit b. Additionally, the MIMO receiver may initialize the variables and index control variables to starting values (block 1405). If the MIMO receiver is implementing an ordered BEB algorithm, the MIMO receiver may also order the received data block (block 1407).

The MIMO receiver may then evaluate backtracking, terminating, and relaxing search conditions (block 1410). In general, detecting codewords from a received data block using the BEB algorithm may be considered to be a search through a search tree wherein the levels of the search tree are the individual received data matrices and the leaves of the search tree at a given level are the possible codewords. The MIMO receiver may initially select a test position (a level of the search tree) and then search through the possible codewords for the particular level of the search tree to find a codeword that satisfies the search conditions.

If there are no untested codewords at the given level, the MIMO receiver may evaluate for backtracking condition by searching through levels of the search tree lower than the current test position (i.e., matrices that are earlier in time) for a highest level lower than the current test position with codewords that have not been tested. If such a backtracking level exists, then the MIMO receiver may backtrack down the search tree to the backtracking level and test the untested codewords in that level. If the MIMO receiver determines that it must backtrack, the MIMO receiver may compute a new test position (level) based on its decision to backtrack and the backtracking level. The MIMO receiver then resets all previously selected codewords for all higher levels greater than that backtracking level (block 1420).

If no backtracking level exists, the MIMO receiver may evaluate for terminate conditions (block 1410) by determining that the search tree has been searched in its entirety (all levels and all leaves of the search tree). When this has been achieved, then the MIMO receiver may finish if a solution (a complete set of codewords one for each level in the tree (i.e., test position) has been detected) has been found.

If the terminate conditions have not been met and no solution has been found, the MIMO receiver may need to repeat the search with relaxed search constraints. The number of times search constraints may be relaxed may be limited by a stopping criterion, for example a maximum value set for the search radius $r_{max}$, a maximum duration of time allowed before the receiver would give up detecting this block of received data, or a number of consecutive times the search constraints have been relaxed without finding a solution. If the stopping criterion is met, an exit is required and the MIMO receiver may then request a re-transmission. A detailed description of the evaluation of backtracking, terminating, and relaxing search conditions is provided in the discussions of the following embodiments.

After evaluating backtracking, terminating, and relaxing search conditions, the MIMO receiver may then perform a check to determine if an exit is required (block 1415). If the MIMO receiver decides that it should proceed with the search, then the MIMO receiver may compute a test position in the search tree to evaluate codewords (block 1420). As discussed previously, the levels of the search tree may correspond to individual received data matrices while the leaves of the search tree may correspond to codewords to be searched. The MIMO receiver may compute the level of the search tree and reset all previously selected codewords in the higher levels in block 1420.

With the test position (level in the search tree) computed in block 1420, the MIMO receiver then may select the next codeword for that test position block 1435. The MIMO receiver then computes a metric, such as a least square error, involving the set of all codewords selected for all the lower levels and up to this level and the corresponding received data matrices (block 1425). The MIMO receiver may perform a check to determine if the metric is greater in value than an error radius (block 1430). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 1430), then the codeword is invalid and the MIMO receiver may return to block 1410 to re-evaluate backtracking, terminating, and relaxing search constraints.

If the metric is not greater than the error radius (block 1430), then the codeword is valid and may be the best codeword for the received data matrix. The MIMO receiver may then perform a check to determine if it has evaluated all test positions (i=P) (block 1440). If the MIMO receiver has not evaluated all possible test positions (i≠P) (block 1440), then the MIMO receiver may proceed to the next level of the search tree (block 1450) and return to block 1410 to re-evaluate backtracking, terminating, and relaxing search constraints. The MIMO receiver may then select a codeword for that new test position (block 1435) and return to block 1425 to compute the new value of the metric.

If the metric is not greater than the error radius (block 1430) and all possible test positions (received data matrices) have been evaluated (block 1440), then the codewords selected for all levels (i=1, . . . , P) are the best codewords detected for the received data block so far and the MIMO receiver may store the detected set of codewords as the best solution so far in an output XOUT (SOUT for joint block differential MIMO) (block 1445). Additionally, the MIMO receiver may reduce the error radius to refine the search through the search tree, allowing only subsequent selections of codewords that are better than the codewords saved in XOUT (or SOUT) to be considered. The MIMO receiver may then return to block 1410 to re-evaluate backtracking and terminating conditions to search if better solutions other than the current solution stored in XOUT (or SOUT) exists. According to an embodiment, once the error radius is reduced upon finding a solution in XOUT (or SOUT) (block 1445), then block 1410 may no longer execute relaxing search constraints and it will only consider evaluating backtracking and terminating conditions.

If the detecting codewords is complete (block 1415), i.e. terminating conditions are met and a solution is found, then the MIMO receiver may output the solution as the set of codewords stored in XOUT (or SOUT) (block 1455), the set of codewords may be processed (block 1460) and receiver operations 1400 may then terminate.

Figure 3:
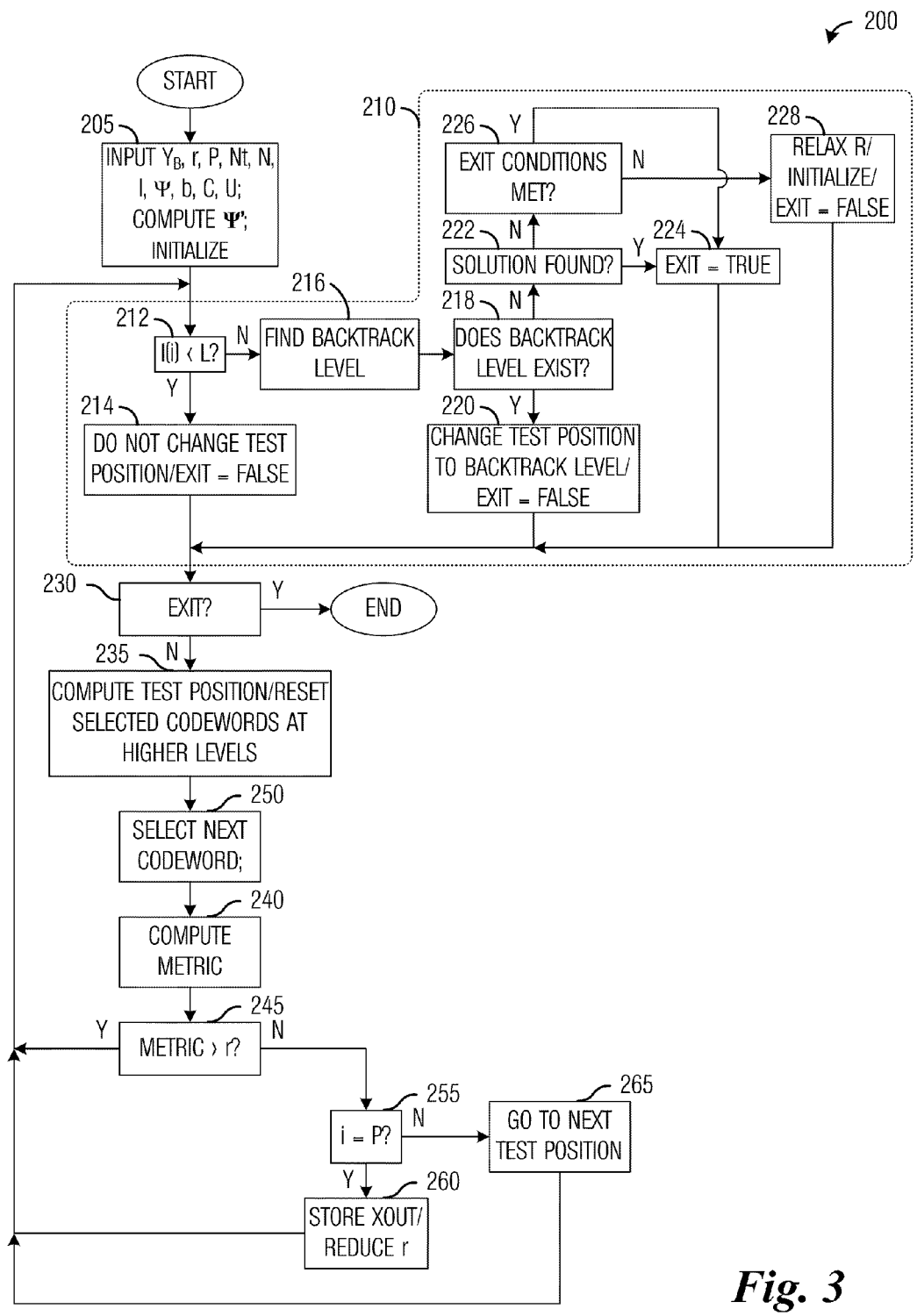
FIG. 3 is a flow diagram of MIMO receiver operations for implementing the BGLRD for blind MIMO detection using a modified BEB algorithm where modified block codewords are used.

FIG. 3 illustrates a flow diagram of MIMO receiver operations 200 for implementing the BGLRD for blind MIMO detection where modified block codewords as in Equation (10) may be used. MIMO receiver operations 200 may also be implemented for identifiable space-time codes as in Equation (7) where the matrix U may be chosen as an identity matrix. MIMO receiver operations 200 may be implemented in MIMO detector and multiplexer block 60 of a MIMO receiver.

MIMO receiver operations 200 may begin with the MIMO receiver (MIMO detector and multiplexer block 60) receiving input parameters (block 205). The input parameters may include: $Y_B$—received data block, r—error radius, P—number of data matrices in received data block, Nt—number of transmit antenna, N—number of time slots spanned by space-time codewords, I—index vector of symbol locations used to keep track of codeword search, Ψ—set of all possible vectors of modulated symbols encoded in each codeword, b—pilot bit which is one bit for real transmissions and two bits for complex transmissions, C—generating matrix of space-time code, and U—unitary matrix used to modify the block code as in Equation (10). Additionally, the MIMO receiver may compute $\Psi'$ (a subset of $\Psi$ that accounts for pilot bit (b) knowledge). Additionally, the MIMO receiver may initialize the variables and index control variables to starting values (block 205).

The MIMO receiver may then evaluate backtracking, terminating, and relaxing search conditions (block 210). The MIMO receiver may evaluate backtracking, terminating, and relaxing search conditions by checking to see if it has tested all codewords on a level (test position) of the search tree (I(i)=L) specified by an index variable i (block 212) where L is the number of possible vectors included in the set $\Psi$. If the MIMO receiver is considering the first test position, i.e., i=1, then L would correspond to the number of vectors in the set $\Psi'$ instead to account for the knowledge of the pilot bit in the first received data matrix. If the MIMO receiver has not tested all codewords on the level of the search tree specified by the index variable i, i.e., (I(i)<L) in block 212, then no backtracking is required and the test position should not be changed (block 214). The evaluating backtracking, terminating, and relaxing search conditions may be complete and detecting codewords is not complete (Exit=FALSE) and MIMO receiver operations 200 may proceed.

If the MIMO receiver has tested all codewords on a level of the search tree specified by the index variable i, i.e., (I(i)=L) in block 212, then the MIMO receiver may perform an additional check to determine if there are any untested codewords on levels of the search tree lower than a current value of i (block 216). The check may determine if there are any untested codewords in the search tree may involve checking to determine if I(i)<L for each possible level of the search tree corresponding to values of the index variable i that are smaller than the current value of i. Preferably, the check may start with the highest level (test position) smaller than the current test position and proceed sequentially to lower levels until a level with untested codeword(s) is found or all test positions checked.

If there are untested codewords (implying that a backtrack level exists) (block 218), then the MIMO receiver may backtrack and set the index variable i to a highest level of the search tree that has untested codewords and is less than the current value of i, i.e., the backtrack level) (block 220). MIMO receiver operations 200 may continue.

If there are no untested codewords, i.e., no backtrack level exists (block 218), then the MIMO receiver may check to determine if detecting codewords is complete and a set of codewords corresponding to the received data block has been found, i.e., a solution (XOUT) has been found (block 222). The MIMO receiver may determine if the detecting codewords is complete by checking an output XOUT. If the output XOUT is empty then a solution has not been found, while if the output XOUT is not empty then a solution has been found and a set of detected codewords corresponding to the received data block has been detected in XOUT. If a solution has been found (block 222), then the terminating conditions are met and evaluating backtracking, terminating, and relaxing search conditions may be complete and detecting codewords is complete (Exit=TRUE) (block 224) and MIMO receiver operations 200 may then terminate.

If no backtrack level exists (block 218) and if detecting codewords has failed (no solution has been found) (block 222), then the MIMO receiver may decide to give up detecting the set of codewords corresponding to this block of received data if exit conditions are met (block 226). Exit conditions may include not being able to find a solution after several (potentially user or system specified) consecutive relaxations of the error radius r, after a certain allowable time period limitation, or if the error radius is relaxed beyond a maximum value (block 226). The MIMO receiver may determine that the received data block is undetectable, then Exit=TRUE (block 224) and MIMO receiver operations 200 may then terminate. A re-transmit request may be issued by the MIMO receiver to a source of the received data block to request that the data block be re-transmitted.

If no backtrack level exists (block 218), no detected set of codewords (solution) has been found (block 222), and exit conditions are not met (block 226), then the MIMO receiver may need to relax an error radius r to loosen the search criteria (block 228). For example, the MIMO receiver may double the size of the error radius r. Additionally, the MIMO receiver may reset the index variable i and the index vector I. The MIMO receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the MIMO receiver may then perform a check to determine if an exit is required (block 230). If the MIMO receiver decides that it should proceed with the search, then the MIMO receiver may compute a test position in the search tree to evaluate codewords (block 235). As discussed previously, the levels of the search tree may correspond to individual received data matrices while the leaves of the search tree may correspond to codewords to be searched. The MIMO receiver may compute the level of the search tree and reset all previously selected codewords in levels higher than the computed test position (level) of the search tree in block 235.

With the test position computed (in block 235), the MIMO receiver selects the next codeword for that test position using the possible set of vectors in the set $\Psi$ (block 250). If the index variable i=1, i.e., first level of the tree is being evaluated, then the codeword is selected based on the set of possible symbol vectors in the set $\Psi'$ rather than $\Psi$. After selecting a codeword for the given test position (level) in block 250, the MIMO receiver may compute a metric in block 240, such as a least square error in Equation (28), involving the set of all codewords selected for all the lower levels and up to this level and the corresponding received data matrices. The MIMO receiver then performs a check to determine if the metric is greater in value than the error radius (block 245). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 245), then the codeword is invalid and the MIMO receiver may return to block 210 to re-evaluate backtracking, terminating, and relaxing search constraints.

If the metric is not greater than the error radius (block 245), then the codeword is valid and may be the best codeword for the received data matrix. The MIMO receiver may then perform a check to determine if it has evaluated all test positions (i=P) (block 255). If the MIMO receiver has not evaluated all possible test positions (i≠P) (block 255), then the MIMO receiver may proceed to the next level of the search tree (block 265) and return to block 210 to re-evaluate backtracking, terminating, and relaxing search constraints.

If the metric is not greater than the error radius (block 245) and if all possible test positions (corresponding to all received data matrices in a block) have been evaluated (block 255), then the codewords selected for all levels (i=1, . . . , P) are the best codewords detected for the received data block so far and the MIMO receiver may store the detected set of codewords as the best solution so far in an output XOUT (block 260). Additionally, the MIMO receiver may reduce the error radius to refine the search through the search tree, allowing only subsequent selections of codewords that are better than the codewords saved in XOUT to be considered. The MIMO receiver may then return to block 210 to re-evaluate backtracking and terminating conditions to search if better solutions other than the current solution stored in XOUT exists. Once the error radius is reduced upon finding a solution in XOUT, then block 210 may no longer execute relaxing search constraints and it will only consider evaluating backtracking and terminating conditions.

If the detecting codewords is complete (block 230), i.e., terminating conditions are met and a solution is found, then MIMO receiver operations 200 may then terminate.

Figure 4:
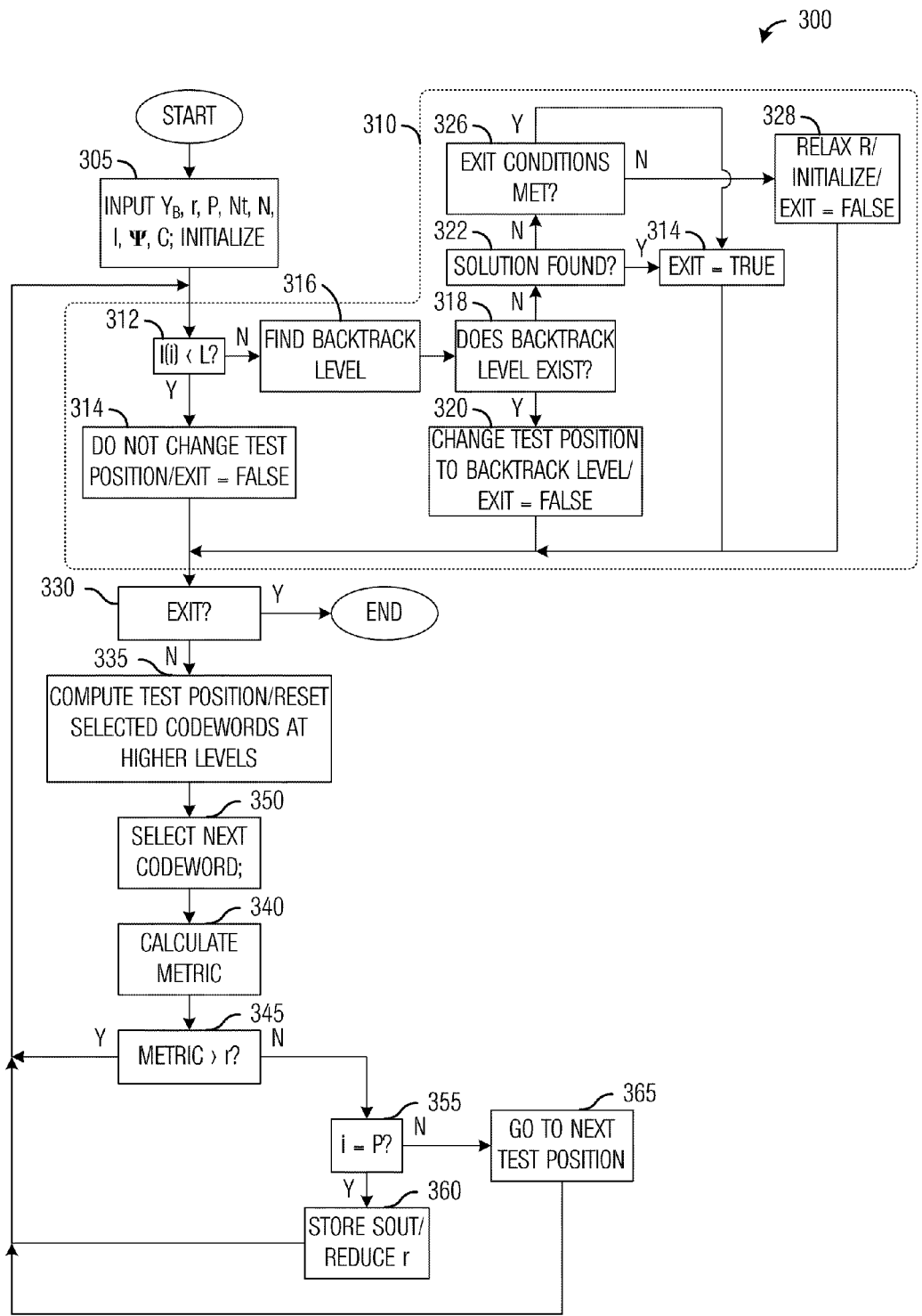
FIG. 4 is a flow diagram of MIMO receiver operations for implementing the DGLRD for joint block differential MIMO using a modified BEB algorithm.

FIG. 4 illustrates a flow diagram of MIMO receiver operations 300 for implementing the DGLRD for joint block differential MIMO. MIMO receiver operations 300 may be implemented in MIMO detector and multiplexer block 60 of a MIMO receiver.

MIMO receiver operations 300 may begin with the MIMO receiver (MIMO detector and multiplexer block 60) receiving as input parameters (block 305). The input parameters may include: $Y_B$, r, P, Nt, N, I, $\Psi$, and C. Additionally, the MIMO receiver may initialize the variables and index control variables to starting values (block 305).

The MIMO receiver may then evaluate backtracking, terminating, and relaxing search conditions (block 310). The MIMO receiver may evaluate backtracking, terminating, and relaxing search conditions by checking to see if it has tested all codewords on a level (test position) of the search tree (I(i)=L) specified by an index variable i (block 312) where L is the number of possible vectors included in the set $\Psi$. For MIMO receiver operations 300, with the pivotal information located at the first received data matrix, the first level corresponding to i=1 may be excluded from the search to account for the pivotal information for block differential encoding as in the example in Equation (23). Similar considerations apply for MIMO receiver operations 300 if the pivotal information is transmitted at any other location in the block other than the first one. If the MIMO receiver has not tested all codewords on the level of the search tree specified by the index variable i, i.e., (I(i)<L) in block 312, then no backtracking is required and the test position should not be changed (block 314). The evaluating backtracking, terminating, and relaxing search conditions may be complete and detecting codewords is not complete (Exit=FALSE) and MIMO receiver operations 300 may proceed.

If the MIMO receiver has tested all codewords on a level of the search tree specified by the index variable i, i.e., (I(i)=L) in block 312, then the MIMO receiver may perform an additional check to determine if there are any untested codewords on levels of the search tree lower than a current value of i (block 316). The check may determine if there are any untested codewords in the search tree may involve checking to determine if I(i)<L for each possible level of the search tree corresponding to values of the index variable i that are smaller than the current value of i, except for i=1. Preferably, the check may start with the highest level (test position) smaller than the current test position and proceed sequentially to lower levels until a level with untested codeword(s) is found or all test positions checked.

If there are untested codewords (implying that a backtrack level exists) (block 318), then the MIMO receiver may backtrack and set the index variable i to a highest level of the search tree that has untested codewords and is less than the current value of i, i.e., the backtrack level) (block 320). The evaluating backtracking, terminating, and relaxing search conditions may be complete but the detecting codewords is not complete (Exit=FALSE) and MIMO receiver operations 300 may proceed (block 330).

If there are no untested codewords, i.e., no backtrack level exists (block 318), then the MIMO receiver may check to determine if detecting codewords is complete and a set of codewords corresponding to the received data block has been found, i.e., a solution (SOUT) has been found (block 322). The MIMO receiver may determine if the detecting codewords is complete by checking an output SOUT. If the output SOUT is empty then a solution has not been found, while if the output SOUT is not empty then a solution has been found and a set of detected codewords corresponding to the received data block has been detected in SOUT. If a solution has been found (block 322), then the terminating conditions are met and evaluating backtracking, terminating, and relaxing search conditions may be complete and detecting codewords is complete (Exit=TRUE) (block 324) and MIMO receiver operations 300 may then terminate.

If no backtrack level exists (block 318) and if detecting codewords has failed (no solution has been found) (block 322), then the MIMO receiver may decide to give up detecting the set of codewords corresponding to this block of received data if exit conditions are met (block 326). Exit conditions may include not being able to find a solution after several (potentially user or system specified) consecutive relaxations of the error radius r, after a certain allowable time period limitation, or if the error radius is relaxed beyond a maximum value (block 326). The MIMO receiver may determine that the received data block is undetectable, then Exit=TRUE (block 324) and MIMO receiver operations 300 may then terminate. A re-transmit request may be issued by the MIMO receiver to a source of the received data block to request that the data block be re-transmitted.

If no backtrack level exists (block 318), no detected set of codewords (solution) has been found (block 322), and exit conditions are not met (block 326), then the MIMO receiver may need to relax an error radius r to loosen the search criteria (block 328). For example, the MIMO receiver may double the size of the error radius r. Additionally, the MIMO receiver may reset other variables, such as the index variable i and the index vector I. The MIMO receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the MIMO receiver may then perform a check to determine if an exit is required (block 330). If the MIMO receiver decides that it should proceed with the search, then the MIMO receiver may compute a test position in the search tree to evaluate codewords (block 335). As discussed previously, the levels of the search tree may correspond to individual received data matrices while the leaves of the search tree may correspond to codewords to be searched. The MIMO receiver may compute the level of the search tree and reset all previously selected codewords in levels higher than the computed test position (level) of the search tree in block 335.

With the test position computed (in block 335), the MIMO receiver selects the next codeword for that test position using the possible set of vectors in the set Ψ (block 350). After selecting a codeword for the given test position (level) in block 350, the MIMO receiver may compute a metric in block 340, such as a least square error in Equation (29), involving the set of all codewords selected for all the lower levels and up to this level and the corresponding received data matrices. The MIMO receiver then performs a check to determine if the metric is greater in value than the error radius (block 345). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 345), then the codeword is invalid and the MIMO receiver may return to block 310 to re-evaluate backtracking, terminating, and relaxing search constraints.

If the metric is not greater than the error radius (block 345), then the codeword is valid and may be the best codeword for the received data matrix. The MIMO receiver may then perform a check to determine if it has evaluated all test positions (i=P) (block 355). If the MIMO receiver has not evaluated all possible test positions (i≠P) (block 355), then the MIMO receiver may proceed to the next level of the search tree (block 365) and return to block 310 to re-evaluate backtracking, terminating, and relaxing search constraints.

If the metric is not greater than the error radius (block 345) and if all possible test positions (corresponding to all received data matrices in a block) have been evaluated (block 355), then the codewords selected for all levels (i=1, . . . , P) are the best codewords detected for the received data block so far and the MIMO receiver may store the detected set of codewords as the best solution so far in the output vector SOUT (block 360). Additionally, the MIMO receiver may reduce the error radius to refine the search through the search tree, allowing only subsequent selections of codewords that are better than the codewords saved in SOUT to be considered. The MIMO receiver may then return to block 310 to re-evaluate backtracking and terminating conditions to search if better solutions other than the current solution stored in SOUT exists. Once the error radius is reduced upon finding a solution in SOUT, then block 310 may no longer execute relaxing search constraints and it will only consider evaluating backtracking and terminating conditions.

If the detecting codewords is complete (block 330), i.e., terminating conditions are met and a solution is found, then MIMO receiver operations 300 may then terminate.

In an alternative embodiment, additional reductions in computational requirements may be achieved by ordering the received data within the received data block of size P prior to detecting the individual codewords. The reduction in computational requirements may be especially dramatic for low SNR situations and/or large block size P. Preferably, the ordering may be performed according to a Frobenius norm of the individual received codewords Y[p] for all p=1, . . . , P.

Since $$Y[p]=HX[p]+V[p], p=1,\ldots,P, \quad (30)$$

then $$\|Y[p]\|^2=\|HX[p]+V[P]\|^2, P=1,\ldots,P. \quad (31)$$

If a possibility of having repeated codewords within a data block is considered, then the following is possible:

if $X[p1]=X[p2]$, where $p1$ and $p2$ belong to $\{1,\ldots,P\}$, then $$\|HX[p1]\|^2=\|HX[p2]\|^2.$$

Additionally, if it is proposed that larger norms of received matrices would most probably correspond to larger noise samples. Then it may be implied that if the received codewords are ordered (in descending order, for example) according to their norm and codewords with the larger norms are searched first, then the search would be performed over the noisy versions first. By searching over the noisy versions first, a reduction in computational requirements may be expected since search backtracks may be avoided as the search proceeds. Accordingly, the reduction in computational requirements arising from ordering the received codewords is expected to be maximized with low SNR scenarios and/or large block sizes (P) and diminish with increasing SNR and decreasing P.

Although ordering of the received codewords may introduce a small amount of additional computational complexity, the amount of additional computational complexity may be minor when compared to the overall reduction in computational requirement gained by ordering the received codewords.

Definition of additional algorithm generated parameters:

O is the 1×P index vector which gives the indices of the received codewords in the block according to the descending order of their Frobenius norm. Hence, the entries in O can only take values in the range 1:P. For example, assume a block of five (5) received codewords i.e. P=5 such that $Y_B=[Y[1], Y[2], Y[3], Y[4], Y[5]]$ and assume that according to the Frobenius norm ordering $\|Y[3]\|>\|Y[1]\|>\|Y[5]\|>\|Y[2]\|>\|Y[4]\|$, then the index vector O may be given by O=[3, 1, 5, 2, 4]. Hence, the ordered BEB algorithm may start the search at i=1 (where i is the counter that tracks the search progress of the algorithm as defined previously) and computes the test position which is given by O(i)=O(1)=3, i.e., the algorithm may search for the codeword corresponding to the third received data matrix in the block first. If the computed metric is less than the error radius, then it will proceed to the next level by incrementing the counter i to i=2 and computing the next test position as O(i)=O(2)=1 which corresponds to the first received data matrix, and so forth until the highest (last) test position being O(P)= O(5)=4 which corresponds to the fourth received data matrix in the block which contains P=5 received matrices. As mentioned previously, each corresponding entry in the index vector I represents the location of the column vector in the set Ψ (or Ψ' when dealing with pilot bit for blind MIMO detection) which may be currently selected by the ordered BEB algorithm as a possible solution for the vector of transmitted symbols at that test position. Considering the example given above, then for i=1, O(1)=3, and hence I(O(1))=6 implies that I(3)=6 which means that the ordered BEB algorithm is currently selecting the sixth column from the left in the set Ψ as a possible solution for the third transmitted vector of symbols in the block of received data which contains P=5 transmitted symbol vectors each encoded in a transmitted codeword;

$X_{O(i)}$ represents the selected codeword by the algorithm for the (O(i))-th location (also referred to as test position or level) in the block which contains P codewords. This notation is used with blind MIMO detection; (O(i))-th location is also referred to as the test position (level) when discussing the ordered BEB algorithm;

Similarly, $S_{O(i)}$ represents the selected codeword by the algorithm for the (O(i))-th location (also referred to as test position or level) in the data block. This notation is used with joint block differential MIMO;

$X_{(O(i))}$ represents the horizontal ordered concatenation of the selected codewords by the modified BEB algorithm that correspond to the entries in the vector O from 1:i, i.e., $X_{(O(i))}=[X_{O(1)}, X_{O(2)}, \ldots, X_{O(i)}]$. If any of the entries in O from 1, . . . , i is equal to 1, then the corresponding codeword in the constructed block $X_{(O(i))}$ has to be pre-multiplied by the matrix U to account for block modified codewords for the golden codewords example as in Equation (10). This notation is used with blind MIMO detection;

Similarly, $S_{(O(i))}$ represents the horizontal ordered concatenation of the identity matrix and the selected codewords by the algorithm that correspond to the entries in the vector O from 2:i, i.e., $S_{(O(i))}=[I, S_{O(2)}, \ldots, S_{O(i)}]$. This notation is used with joint block differential MIMO. For block differential MIMO according to the example given in Equation (23), O(1)=1, i.e., the first level (test position) may be reserved for the received data matrix corresponding to the pivotal information and is excluded from the search performed by the algorithm. Additionally, $S_{(O(1))}$ is always equal to the identity matrix to account for the block differential MIMO encoding as discussed previously. Similar considerations should apply if the pivotal information for block differential encoding is located at locations in the transmitted block other than the first position;

$X_{(O(>i))}$ represents the horizontal ordered concatenation of the selected codewords by the algorithm that correspond to the entries in the vector O from (i+1):P, i.e., $X_{(O(>i))}=[X_{O(i+1)}, X_{O(i+2)}, \ldots, X_{O(P)}]$. If any of the entries in O from (i+1), . . . , P is equal to 1, then the corresponding codeword in $X_{(O(>i))}$ has to be pre-multiplied by the matrix U to account for modified block codewords as in the golden codewords example in Equation (10). This notation is used with blind MIMO detection;

Similarly, $S_{(O(>i))}$ represents the horizontal ordered concatenation of the selected codewords in the block that correspond to the entries in the vector O from (i+1):P, i.e., $S_{O(>i))}=[S_{O(i+1)}, S_{O(i+2)}, \ldots, S_{O(P)}]$. This notation is used with joint block differential MIMO;

The LSE metric $M_{X(O(i))}$ is computed based on the information in the corresponding ordered filled indices, i.e., $$M_{X(O(i))}=\|Y_{(O(i))}-Y_{(O(i))}X^H{}_{(O(i))}(X_{(O(i))}X^H{}_{(O(i))})^{-1}X_{(O(i))}\|^2, \quad (32)$$

where $X_{(O(i))}$ is as defined above and $Y_{O(i)}$ represents the horizontal ordered concatenation of the received data matrices in the received data block $Y_B$ that correspond to the entries in the vector O from 1, . . . , i, i.e., $Y_{O(i)}=[Y[O(1)], Y[O(2)], \ldots, Y[O(i)]]$. This notation is used with blind MIMO detection;

Similarly, the LSE metric $M_{S(O(i))}$ is computed for joint block differential MIMO using only the information in $S_{(O(i))}$ and the corresponding received information in $Y_{(O(i))}$, i.e.

$$M_{S(O(i))}=\|Y_{(O(i))}-Y^{(O(i))}S^H{}_{(O(i))}(S_{(O(i))}S^H{}_{(O(i))})\|^2, \quad (33)$$

Figure 5:
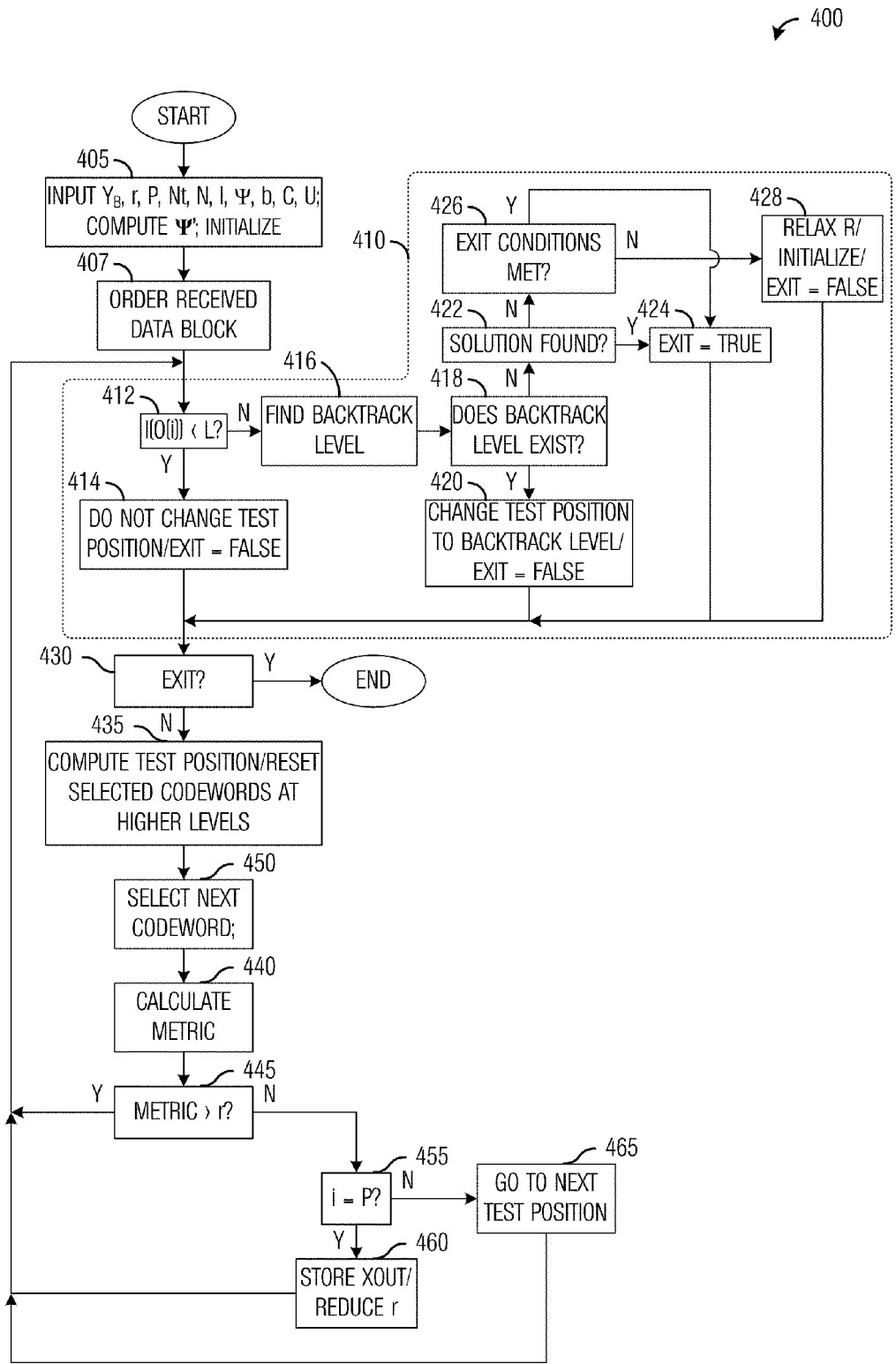
FIG. 5 is a flow diagram of MIMO receiver operations for implementing the BGLRD using the ordered BEB algorithm for blind MIMO detection where modified block codewords are used.

FIG. 5 illustrates a flow diagram of MIMO receiver operations 400 for implementing an ordered BEB algorithm for blind MIMO detection where modified block codewords as in Equation (10) for example are used. MIMO receiver operations 400 may also be implemented for identifiable space-time codes as in Equation (7) where the matrix U may be chosen as an identity matrix. MIMO receiver operations 400 may be implemented in MIMO detector and multiplexer block 60 of a MIMO receiver.

MIMO receiver operations 400 may begin with the MIMO receiver (MIMO detector and multiplexer block 60) receiving as input parameters (block 405). The input parameters may include: $Y_B$, r, P, Nt, N, I, $\Psi$, b, C, and U. Additionally, the MIMO receiver may compute $\Psi'$ (subset of $\Psi$ that accounts for pilot bit (b) knowledge) as well as initialize variables and index control variables to starting values. After receiving the input values and computing $\Psi'$, the MIMO receiver may order the received data block $Y_B$ (block 407). As discussed previously, the MIMO receiver may order the received data block $Y_B$ in descending order based on a Frobenius norm of the individual received data matrices. An index to the ordered received data block may be saved as vector O.

The MIMO receiver may then evaluate backtracking, terminating, and relaxing search conditions (block 410). The MIMO receiver may evaluate backtracking, terminating, and relaxing search conditions by checking to see if it has tested all codewords on a level (test position) of the search tree (I(O)(i))=L) specified by an index variable O(i) (block 412) where L is the number of possible vectors included in the set $\Psi$. If the MIMO receiver is considering the test position corresponding to the first received data matrix, i.e., O(i)=1, then L would correspond to the number of vectors in the set $\Psi'$ instead to account for the knowledge of the pilot bit in the first received data matrix. If the MIMO receiver has not tested all codewords on the level of the search tree specified by the index variable O(i), i.e., (I(O(i))<L) in block 412, then no backtracking is required and the test position should not be changed (block 414). The evaluating backtracking, terminating, and relaxing search conditions may be complete and detecting codewords is not complete (Exit=FALSE) and MIMO receiver operations 400 may proceed.

If the MIMO receiver has tested all codewords on a level of the search tree specified by the index variable O(i), i.e., (I(O(i))=L) in block 412, then the MIMO receiver may perform an additional check to determine if there are any untested codewords on levels of the search tree lower than a current value of O(i) (block 416) i.e. levels specified in the first to the (i−1)-th entries in the index vector O. The check may determine if there are any untested codewords in the search tree may involve checking to determine if I(O(i))<L for each possible level of the search tree corresponding to values of the index variable O(i) for values of i smaller than the current value of i. Preferably, the check may start with the highest level (test position) smaller than the current test position, i.e., the test position given by the entry in O(i−1) and proceed sequentially to lower levels until a level with untested codeword(s) is found or all test positions checked.

If there are untested codewords (implying that a backtrack level exists) (block 418), then the MIMO receiver may backtrack to a highest level of the search tree that has untested codewords lower than the current level (which corresponds to a last entry in the first (i−1) entries in the index vector O that has untested codewords), i.e., the backtrack level (block 420). MIMO receiver operations 400 may continue.

If there are no untested codewords, i.e., no backtrack level exists (block 418), then the MIMO receiver may check to determine if detecting codewords is complete and a set of codewords corresponding to the received data block has been found, i.e., a solution (XOUT) has been found (block 422). The MIMO receiver may determine if the detecting codewords is complete by checking an output XOUT. If the output XOUT is empty then a solution has not been found, while if the output XOUT is not empty then a solution has been found and a set of detected codewords corresponding to the received data block has been detected in XOUT. If a solution has been found (block 422), then the terminating conditions are met and evaluating backtracking, terminating, and relaxing search conditions may be complete and detecting codewords is complete (Exit=TRUE) (block 424) and MIMO receiver operations 400 may then terminate.

If no backtrack level exists (block 418) and if detecting codewords has failed (no solution has been found) (block 422), then the MIMO receiver may decide to give up detecting the set of codewords corresponding to this block of received data if exit conditions are met (block 426). Exit conditions may include not being able to find a solution after several (potentially user or system specified) consecutive relaxations of the error radius r, after a certain allowable time period limitation, or if the error radius is relaxed beyond a maximum value (block 426). The MIMO receiver may determine that the received data block is undetectable, then Exit=TRUE (block 424) and MIMO receiver operations 400 may then terminate. A re-transmit request may be issued by the MIMO receiver to a source of the received data block to request that the data block be re-transmitted.

If no backtrack level exists (block 418), no detected set of codewords (solution) has been found (block 422), and exit conditions are not met (block 426), then the MIMO receiver may need to relax an error radius r to loosen the search criteria (block 428). For example, the MIMO receiver may double the size of the error radius r. Additionally, the MIMO receiver may reset variables, such as the index variable i, and the index vector I. The MIMO receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the MIMO receiver may then perform a check to determine if an exit is required (block 430). If the MIMO receiver decides that it should proceed with the search, then the MIMO receiver may compute a test position in the search tree to evaluate codewords (block 435). As discussed previously, the levels of the search tree may correspond to individual received data matrices while the leaves of the search tree may correspond to codewords to be searched. The MIMO receiver may compute the level of the search tree and reset all previously selected codewords in levels higher than the computed test position (level) of the search tree in block 435, i.e., levels that correspond to the (P−i) last entries in the index vector O.

With the test position computed (in block 435), the MIMO receiver selects the next codeword for that test position using the possible set of vectors in the set $\Psi$ (block 450). If the index variable O(i)=1, i.e., the test position corresponding to the first received data matrix in the block is being evaluated, then the codeword is selected based on the set of possible symbol vectors in the set $\Psi'$ rather than $\Psi$. After selecting a codeword for the given test position (level) in block 450, the MIMO receiver may compute a metric in block 440, such as a least square error in Equation (32), involving the set of all codewords selected for all levels corresponding to the first i entries in the index vector O and the corresponding received data matrices. The MIMO receiver then performs a check to determine if the metric is greater in value than the error radius (block 445). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 445), then the codeword is invalid and the MIMO receiver may return to block 410 to re-evaluate backtracking, terminating, and relaxing search constraints.

If the metric is not greater than the error radius (block 445), then the codeword is valid and may be the best codeword for the received data matrix. The MIMO receiver may then perform a check to determine if it has evaluated all test positions (i=P) (block 455). If the MIMO receiver has not evaluated all possible test positions (i≠P) (block 455), then the MIMO receiver may proceed to the next level of the search tree, i.e., O(i+1) (block 465) and return to block 410 to re-evaluate backtracking, terminating, and relaxing search constraints.

If the metric is not greater than the error radius (block 445) and if all possible test positions (corresponding to all received data matrices in a block) have been evaluated (block 455), then the codewords selected for all levels (i=1, . . . , P) are the best codewords detected for the received data block so far and the MIMO receiver may store the detected set of codewords as the best solution so far in an output XOUT (block 460). Additionally, the MIMO receiver may reduce the error radius to refine the search through the search tree, allowing only subsequent selections of codewords that are better than the codewords saved in XOUT to be considered. The MIMO receiver may then return to block 410 to re-evaluate backtracking and terminating conditions to search if better solutions other than the current solution stored in XOUT exists. Once the error radius is reduced upon finding a solution in XOUT, then block 410 may no longer execute relaxing search constraints and it will only consider evaluating backtracking and terminating conditions.

If the detecting codewords is complete (block 430), i.e., terminating conditions are met and a solution is found, then MIMO receiver operations 400 may then terminate.

Figure 6:
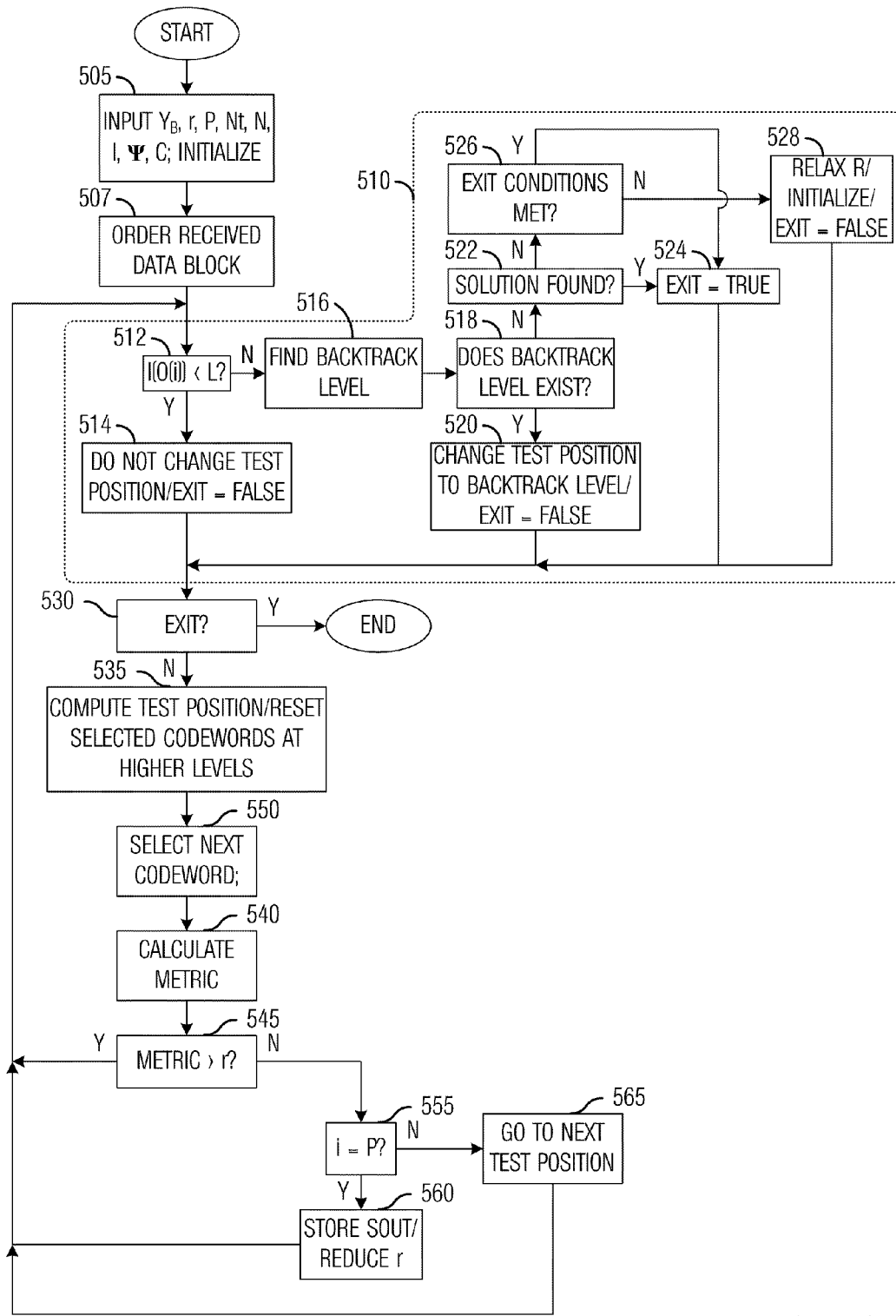
FIG. 6 is a flow diagram of MIMO receiver operations for implementing the DGLRD using an ordered BEB algorithm for joint block differential MIMO.

FIG. 6 illustrates a flow diagram of MIMO receiver operations 500 for implementing an ordered BEB algorithm for joint block differential MIMO. Algorithm 500 may be implemented in MIMO detector and multiplexer block 60 of a MIMO receiver.

MIMO receiver operations 500 may begin with the MIMO receiver (MIMO detector and multiplexer block 60) receiving as input parameters (block 505). The input parameters may include: $Y_B$, r, P, Nt, N, I, $\Psi$, and C. Additionally, the MIMO receiver may initialize the variables and index control variables to starting values. After receiving the input values, the MIMO receiver may order the received data block $Y_B$ (block 507). As discussed previously, the MIMO receiver may order the received data block $Y_B$ in descending order based on a Frobenius norm of the individual received codewords. The received data matrix corresponding to the pivotal information may be excluded from ordering and may take the first test position in the search tree, i.e., the first entry in the index vector O. This test position (i.e. O(1)) will then be excluded from the search performed by the MIMO receiver. Following the example in Equation (23), O(1)=1. An index to the ordered received data block may be saved as vector O.

The MIMO receiver may then evaluate backtracking, terminating, and relaxing search conditions (block 510). The MIMO receiver may evaluate backtracking, terminating, and relaxing search conditions by checking to see if it has tested all codewords on a level (test position) of the search tree (I(O(i))=L) specified by O(i) (block 512) where L is the number of possible vectors included in the set Ψ. The first test position O(i)=O(1)=1 corresponding to the received pivotal information may be excluded from the search to account for block differential encoding as in Equation (23). If the MIMO receiver has not tested all codewords on the level of the search tree specified by the index variable O(i), i.e., (I(O(i))<L) in block 512, then no backtracking is required and the test position should not be changed (block 514). The evaluating backtracking, terminating, and relaxing search conditions may be complete and detecting codewords is not complete (Exit=FALSE) and MIMO receiver operations 500 may proceed.

If the MIMO receiver has tested all codewords on a level of the search tree specified by O(i), i.e., (I(O(i))=L) in block 512, then the MIMO receiver may perform an additional check to determine if there are any untested codewords on levels of the search tree that are specified in the first (i−1) entries in the index vector O (excluding O(1) where pivotal information for block encoding is taken into account) (block 516). The check may determine if there are any untested codewords in the search tree may involve checking to determine if I(O(i))<L for each possible level of the search tree given by the entries in O(i) for values of i that are smaller than the current value of i (except i=1). Preferably, the check may start with the highest level (test position) lower than the current test position i.e. O(i−1) and proceed sequentially to lower levels until a level with untested codeword(s) is found or all test positions checked.

If there are untested codewords (implying that a backtrack level exists) (block 518), then the MIMO receiver may backtrack to a highest level of the search tree that has untested codewords and is less than the current level O(i) (this level corresponds to a last entry in the first (i−1) entries in the vector O that has untested codewords and not equal to O(1) where the pivotal information for block differential encoding is taken into account), i.e., the backtrack level (block 520). The evaluating backtracking, terminating, and relaxing search conditions may be complete but the detecting codewords is not complete (Exit=FALSE) and MIMO receiver operations 500 may proceed (block 530).

If there are no untested codewords, i.e., no backtrack level exists (block 518), then the MIMO receiver may check to determine if detecting codewords is complete and a set of codewords corresponding to the received data block has been found, i.e., a solution (SOUT) has been found (block 522). The MIMO receiver may determine if the detecting codewords is complete by checking an output SOUT. If the output SOUT is empty then a solution has not been found, while if the output SOUT is not empty then a solution has been found and a set of detected codewords corresponding to the received data block has been detected in SOUT. If a solution has been found (block 522), then the terminating conditions are met and evaluating backtracking, terminating, and relaxing search conditions may be complete and detecting codewords is complete (Exit=TRUE) (block 524) and MIMO receiver operations 500 may then terminate.

If no backtrack level exists (block 518) and if detecting codewords has failed (no solution has been found) (block 522), then the MIMO receiver may decide to give up detecting the set of codewords corresponding to this block of received data if exit conditions are met (block 526). Exit conditions may include not being able to find a solution after several (potentially user or system specified) consecutive relaxations of the error radius r, after a certain allowable time period limitation, or if the error radius is relaxed beyond a maximum value (block 526). The MIMO receiver may determine that the received data block is undetectable, then Exit=TRUE (block 524) and MIMO receiver operations 500 may then terminate. A re-transmit request may be issued by the MIMO receiver to a source of the received data block to request that the data block be re-transmitted.

If no backtrack level exists (block 518), no detected set of codewords (solution) has been found (block 522), and exit conditions are not met (block 526), then the MIMO receiver may need to relax an error radius r to loosen the search criteria (block 528). For example, the MIMO receiver may double the size of the error radius r. Additionally, the MIMO receiver may reset variables, such as the index variable i and the index vector I. The MIMO receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the MIMO receiver may then perform a check to determine if an exit is required (block 630). If the MIMO receiver decides that it should proceed with the search, then the MIMO receiver may compute a test position in the search tree to evaluate codewords (block 535). As discussed previously, the levels of the search tree may correspond to individual received data matrices while the leaves of the search tree may correspond to codewords to be searched. The MIMO receiver may compute the level of the search tree and reset all previously selected codewords in levels higher than the computed test position (level) of the search tree in block 535, i.e., levels specified in the last (P−i) entries in the index vector O.

With the test position computed (in block 535), the MIMO receiver selects the next codeword for that test position using the possible set of vectors in the set Ψ (block 550). After selecting a codeword for the given test position (level) in block 650, the MIMO receiver may compute a metric in block 540, such as a least square error in Equation (33), involving the set of all codewords selected for all the lower levels and up to this level and the corresponding received data matrices. The MIMO receiver then performs a check to determine if the metric is greater in value than the error radius (block 545). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 545), then the codeword is invalid and the MIMO receiver may return to block 510 to re-evaluate backtracking, terminating, and relaxing search constraints.

If the metric is not greater than the error radius (block 545), then the codeword is valid and may be the best codeword for the received data matrix. The MIMO receiver may then perform a check to determine if it has evaluated all test positions (i=P) (block 555). If the MIMO receiver has not evaluated all possible test positions (i≠P) (block 555), then the MIMO receiver may proceed to the next level of the search tree, i.e., O(i+1) (block 565) and return to block 510 to re-evaluate backtracking, terminating, and relaxing search constraints.

If the metric is not greater than the error radius (block 545) and if all possible test positions (corresponding to all received data matrices in a block) have been evaluated (block 555), then the codewords selected for all levels (i=1, . . . , P) are the best codewords detected for the received data block so far and the MIMO receiver may store the detected set of codewords as the best solution so far in the output vector SOUT (block 560). Additionally, the MIMO receiver may reduce the error radius to refine the search through the search tree, allowing only subsequent selections of codewords that are better than the codewords saved in SOUT to be considered. The MIMO receiver may then return to block 510 to re-evaluate backtracking and terminating conditions to search if better solutions other than the current solution stored in SOUT exists. Once the error radius is reduced upon finding a solution in SOUT, then block 510 may no longer execute relaxing search constraints and it will only consider evaluating backtracking and terminating conditions.

If the detecting codewords is complete (block 530), i.e., terminating conditions are met and a solution is found, then MIMO receiver operations 500 may then terminate.

In another alternative embodiment, additional reduction in computational requirements may be obtained by modifying the modified BEB algorithm for blind MIMO detection by ordering the received data matrices in the received data block $Y_B$ except for the received data matrix that comprises the received pilot information b. As discussed previously, it may be assumed that the pilot information is contained in the first received data matrix, i.e., Y[1]. However, in practice, the pilot information may be contained in any received data matrix in the received data block.

Figure 7:
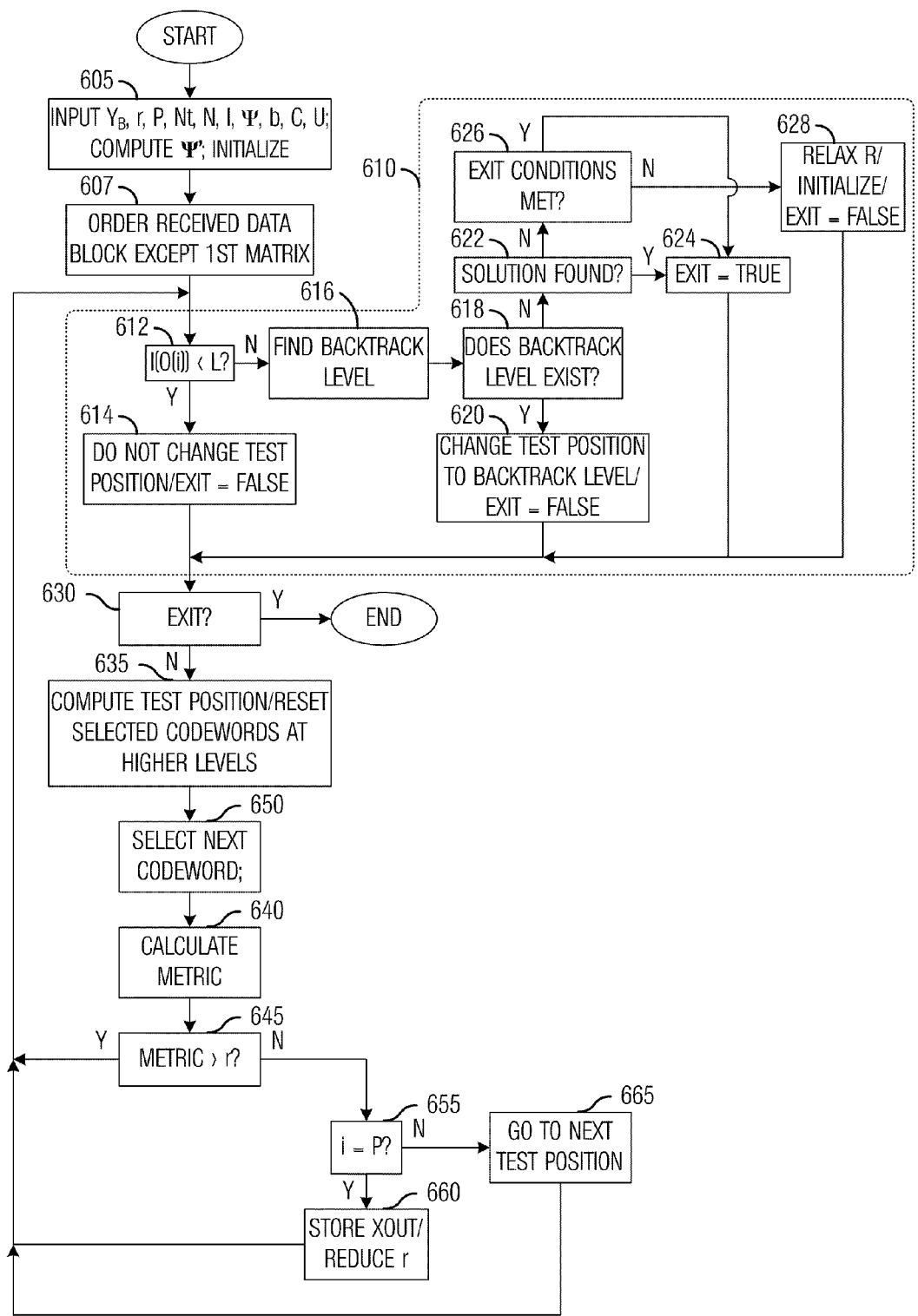
FIG. 7 is a flow diagram of MIMO receiver operations for implementing the BGLRD using the ordered BEB algorithm for blind MIMO detection where modified block codewords are used and excluding the first received data matrix containing a pilot bit from ordering.

FIG. 7 illustrates a flow diagram of MIMO receiver operations 600 for implementing an ordered BEB algorithm for blind MIMO detection where modified block codewords as in Equation (10) and a first received data matrix containing a pilot bit are used. Receiver operations 600 may also be implemented for identifiable space-time codes as in Equation (7) where the matrix U may be chosen as an identity matrix. MIMO receiver operations 600 may be implemented in MIMO detector and multiplexer block 60 of a MIMO receiver.

MIMO receiver operations 600 may begin with the MIMO receiver (MIMO detector and multiplexer block 60) receiving as input parameters (block 605). The input parameters may include: $Y_B$, r, P, Nt, N, I, $\Psi$, b, C, and U. Additionally, the MIMO receiver may compute $\Psi'$ (subset of $\Psi$ that accounts for pilot bit (b) knowledge) as well as initialize variables and index control variables to starting values. After receiving the input values and computing $\Psi'$, the MIMO receiver may order the received data block $Y_B$ (block 607). As discussed previously, the MIMO receiver may order the received data block $Y_B$ in descending order based on a Frobenius norm of the individual received codewords, with the exception of Y[1], the received data matrix containing the pilot bit b. An index to the ordered received data block may be saved as vector O, which, with exception of the first entry comprises the indices of the ordered received data block. The first entry may store an index to the received data matrix containing the pilot bit b, i.e., numeral one (1). For example, vector O=[1 Ō], where Ō is an index to the ordered received data block excluding the first received data matrix Y[1] that contains the pilot information.

The MIMO receiver may then evaluate backtracking, terminating, and relaxing search conditions (block 610). The MIMO receiver may evaluate backtracking, terminating, and relaxing search conditions by checking to see if it has tested all codewords on a level (test position) of the search tree (I(O(i))=L) specified by O(i) (block 612) where L is the number of possible vectors included in the set $\Psi$. If the MIMO receiver is considering the first test position, i.e., O(i)=1, then L would correspond to the number of vectors in the set $\Psi'$ instead to account for the knowledge of the pilot bit in the first received data matrix. If the MIMO receiver has not tested all codewords on the level of the search tree specified by O(i), i.e., (I(O(i))<L) in block 612, then no backtracking is required and the test position should not be changed (block 614). The evaluating backtracking, terminating, and relaxing search conditions may be complete and detecting codewords is not complete (Exit=FALSE) and MIMO receiver operations 400 may proceed.

If the MIMO receiver has tested all codewords on a level of the search tree specified by O(i), i.e., (I(O(i))=L) in block 612, then the MIMO receiver may perform an additional check to determine if there are any untested codewords on levels of the search tree lower than the current level O(i) (block 616). The check may determine if there are any untested codewords in the search tree may involve checking to determine if I(O(i)) <L for each possible level of the search tree specified by the first (i−1) entries in the vector O. Preferably, the check may start with the highest level (test position) smaller than the current test position, i.e., O(i−1) and proceed sequentially to lower levels until a level with untested codeword(s) is found or all test positions checked.

If there are untested codewords (implying that a backtrack level exists) (block 618), then the MIMO receiver may backtrack to a highest level of the search tree that has untested codewords and is lower than the current test position given by O(i) (which corresponds to a last entry in the first (i−1) entries in the vector O that has untested codewords) i.e., the backtrack level) (block 620). MIMO receiver operations 600 may continue.

If there are no untested codewords, i.e., no backtrack level exists (block 618), then the MIMO receiver may check to determine if detecting codewords is complete and a set of codewords corresponding to the received data block has been found, i.e., a solution (XOUT) has been found (block 622). The MIMO receiver may determine if the detecting codewords is complete by checking an output XOUT. If the output XOUT is empty then a solution has not been found, while if the output XOUT is not empty then a solution has been found and a set of detected codewords corresponding to the received data block has been detected in XOUT. If a solution has been found (block 622), then the terminating conditions are met and evaluating backtracking, terminating, and relaxing search conditions may be complete and detecting codewords is complete (Exit=TRUE) (block 624) and MIMO receiver operations 400 may then terminate.

If no backtrack level exists (block 618) and if detecting codewords has failed (no solution has been found) (block 622), then the MIMO receiver may decide to give up detecting the set of codewords corresponding to this block of received data if exit conditions are met (block 626). Exit conditions may include not being able to find a solution after several (potentially user or system specified) consecutive relaxations of the error radius r, after a certain allowable time period limitation, or if the error radius is relaxed beyond a maximum value (block 626). The MIMO receiver may determine that the received data block is undetectable, then Exit=TRUE (block 624) and MIMO receiver operations 600 may then terminate. A re-transmit request may be issued by the MIMO receiver to a source of the received data block to request that the data block be re-transmitted.

If no backtrack level exists (block 618), no detected set of codewords (solution) has been found (block 622), and exit conditions are not met (block 626), then the MIMO receiver may need to relax an error radius r to loosen the search criteria (block 628). For example, the MIMO receiver may double the size of the error radius r. Additionally, the MIMO receiver may reset variables, such as the index variable i and the index vector I. The MIMO receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the MIMO receiver may then perform a check to determine if an exit is required (block 630). If the MIMO receiver decides that it should proceed with the search, then the MIMO receiver may compute a test position in the search tree to evaluate codewords (block 635). As discussed previously, the levels of the search tree may correspond to individual received data matrices while the leaves of the search tree may correspond to codewords to be searched. The MIMO receiver may compute the level of the search tree and reset all previously selected codewords in levels higher than the computed test position (level) of the search tree in block 635, i.e., reset codewords previously selected for the levels specified by the last (P−i) entries in the vector O.

With the test position computed (in block 635), the MIMO receiver selects the next codeword for that test position using the possible set of vectors in the set Ψ (block 650). If O(i)=1, i.e., the test position corresponding to the first received data matrix in the block is being evaluated, then the codeword is selected based on the set of possible symbol vectors in the set Ψ' rather than Ψ. After selecting a codeword for the given test position (level) in block 650, the MIMO receiver may compute a metric in block 440, such as a least square error in Equation (32), involving the set of all codewords selected for all the lower levels and up to this level and the corresponding received data matrices. The MIMO receiver then performs a check to determine if the metric is greater in value than the error radius (block 645). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 645), then the codeword is invalid and the MIMO receiver may return to block 610 to re-evaluate backtracking, terminating, and relaxing search constraints.

If the metric is not greater than the error radius (block 645), then the codeword is valid and may be the best codeword for the received data matrix. The MIMO receiver may then perform a check to determine if it has evaluated all test positions (i=P) (block 655). If the MIMO receiver has not evaluated all possible test positions (i≠P) (block 655), then the MIMO receiver may proceed to the next level of the search tree, i.e., O(i+1) (block 665) and return to block 610 to re-evaluate backtracking, terminating, and relaxing search constraints.

If the metric is not greater than the error radius (block 645) and if all possible test positions (corresponding to all received data matrices in a block) have been evaluated (block 655), then the codewords selected for all levels (i=1, . . . , P) are the best codewords detected for the received data block so far and the MIMO receiver may store the detected set of codewords as the best solution so far in an output XOUT (block 660). Additionally, the MIMO receiver may reduce the error radius to refine the search through the search tree, allowing only subsequent selections of codewords that are better than the codewords saved in XOUT to be considered. The MIMO receiver may then return to block 610 to re-evaluate backtracking and terminating conditions to search if better solutions other than the current solution stored in XOUT exists. Once the error radius is reduced upon finding a solution in XOUT, then block 610 may no longer execute relaxing search constraints and it will only consider evaluating backtracking and terminating conditions.

If the detecting codewords is complete (block 630), i.e., terminating conditions are met and a solution is found, then MIMO receiver operations 600 may then terminate.

Results of performance evaluations of the modified BEB algorithms presented herein are presented below. Performance evaluations for a 2×2 MIMO communications system applying the golden code were performed, with data generated as follows: a given scenario may be characterized by a fixed channel matrix H whose elements may be picked from a zero mean unit variance complex Gaussian distribution. Each codeword may be a 2×2 matrix generated using the golden code with 4 binary phase-shift keying (BPSK) symbols. A set of P codewords may be generated for each channel scenario. Received data may be generated by multiplying the transmitted data block by the channel matrix and adding measurement noise, which may be assumed to be complex Gaussian with zero mean and variance adjusted according to the SNR. The process is repeated for 50000 channel scenarios and an average bit error rate (BER) is computed. Results using a coherent ML detector with perfect channel knowledge at the receiver are also shown for reference.

For joint block differential MIMO detection, the pivotal data matrix X[1] may be chosen as a scaled identity matrix. With joint block differential MIMO and fully blind MIMO detectors, optimal DGLRD (Equation (24)) and BGLRD (Equation (15)) receivers may be implemented using corresponding ordered versions of the modified BEB algorithm unless specifically noted. For fully blind MIMO, the modified golden block code (as defined in Equation (10)) is used where the first codeword in the received data block may be pre-multiplied by a 20 degree rotational matrix U as defined in Equation (12). Additionally, the first bit in the first codeword of each transmitted data block of size P codewords may be defined as pilot bit b to eliminate scalar ambiguity inherent with blind detection.

Figure 8:
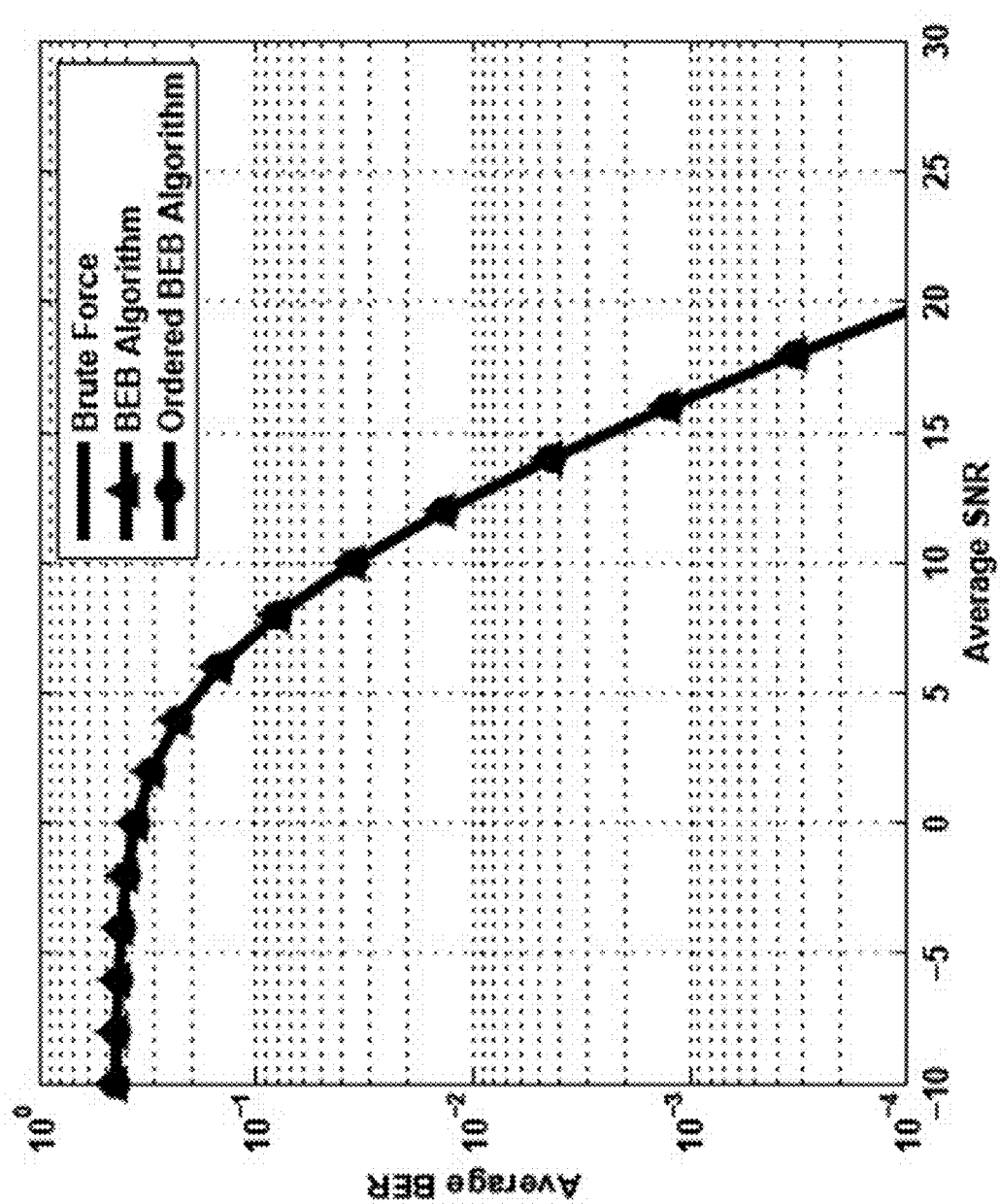
FIG. 8 is a data plot of the performance of a blind MIMO communications system with P=3.

FIG. 8 illustrates a data plot of the performance of a blind MIMO communications system with P=3. The data plot displays average BER versus average SNR of a fully blind MIMO communications system applying modified block codes as in Equation (10) using a BGLRD receiver as defined in Equation (15). A small value of P (P=3) is chosen to show that the modified BEB algorithms (both ordered and unordered) provide substantially the same performance as that obtained using an exhaustive search algorithm. As shown in FIG. 8, the performance results of the modified BEB algorithms coincide with the performance results of the exhaustive (brute force) search algorithm.

Figure 9:
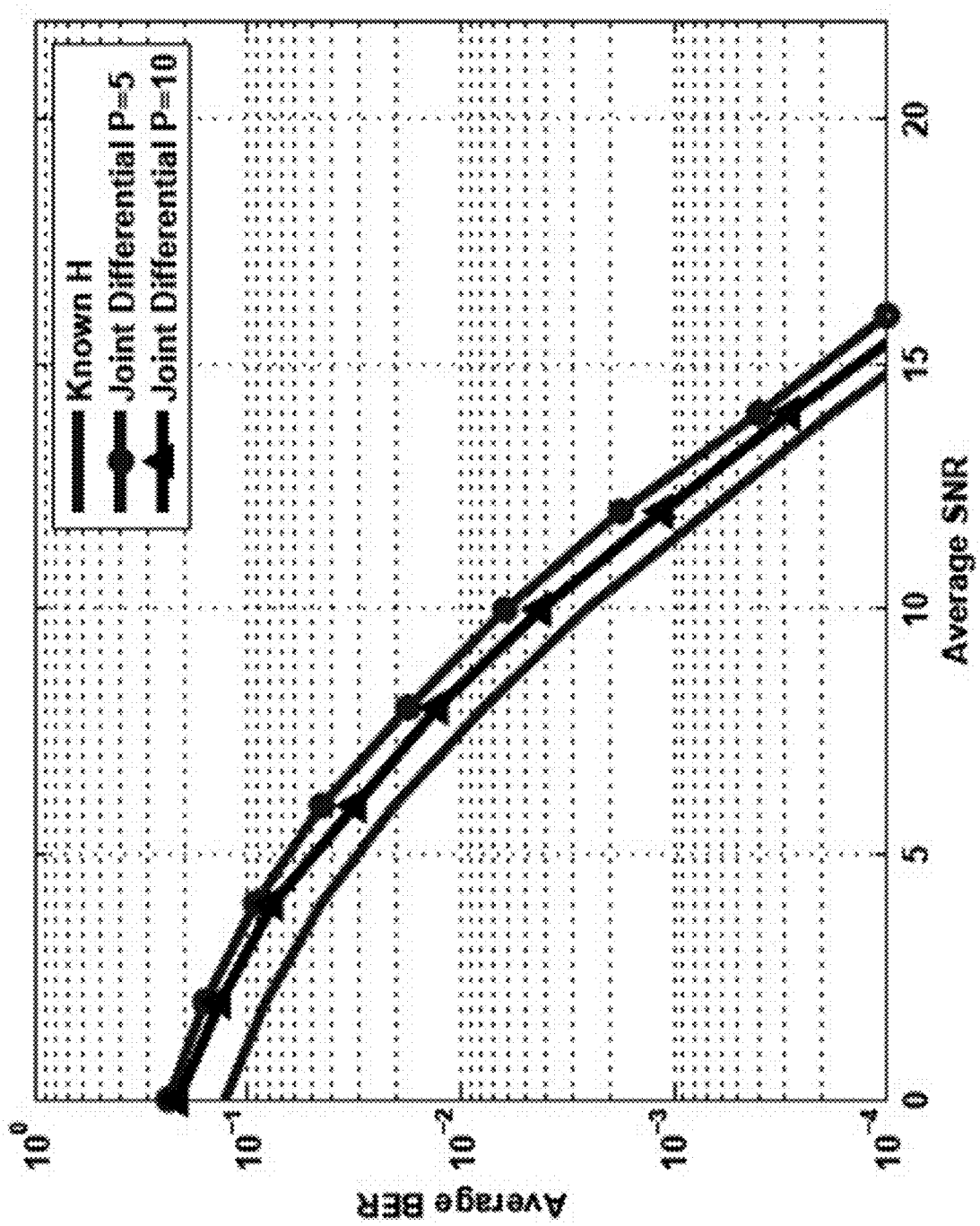
FIG. 9 is a data plot of the performance of a joint block differential MIMO communications system with P=5 and 10 using the ordered BEB algorithm of FIG. 6 at the receiver.

FIG. 9 illustrates a data plot of the performance of a joint block differential MIMO communications system with P=5 and 10 for the ordered BEB algorithm. The performance results for a MIMO communications system with a perfectly known communications channel are also shown for comparative purposes. As shown in FIG. 9, the performance results of the scenario with longer received data blocks yield performance closer to the MIMO communications system with the perfectly known communications channel.

Figure 10:
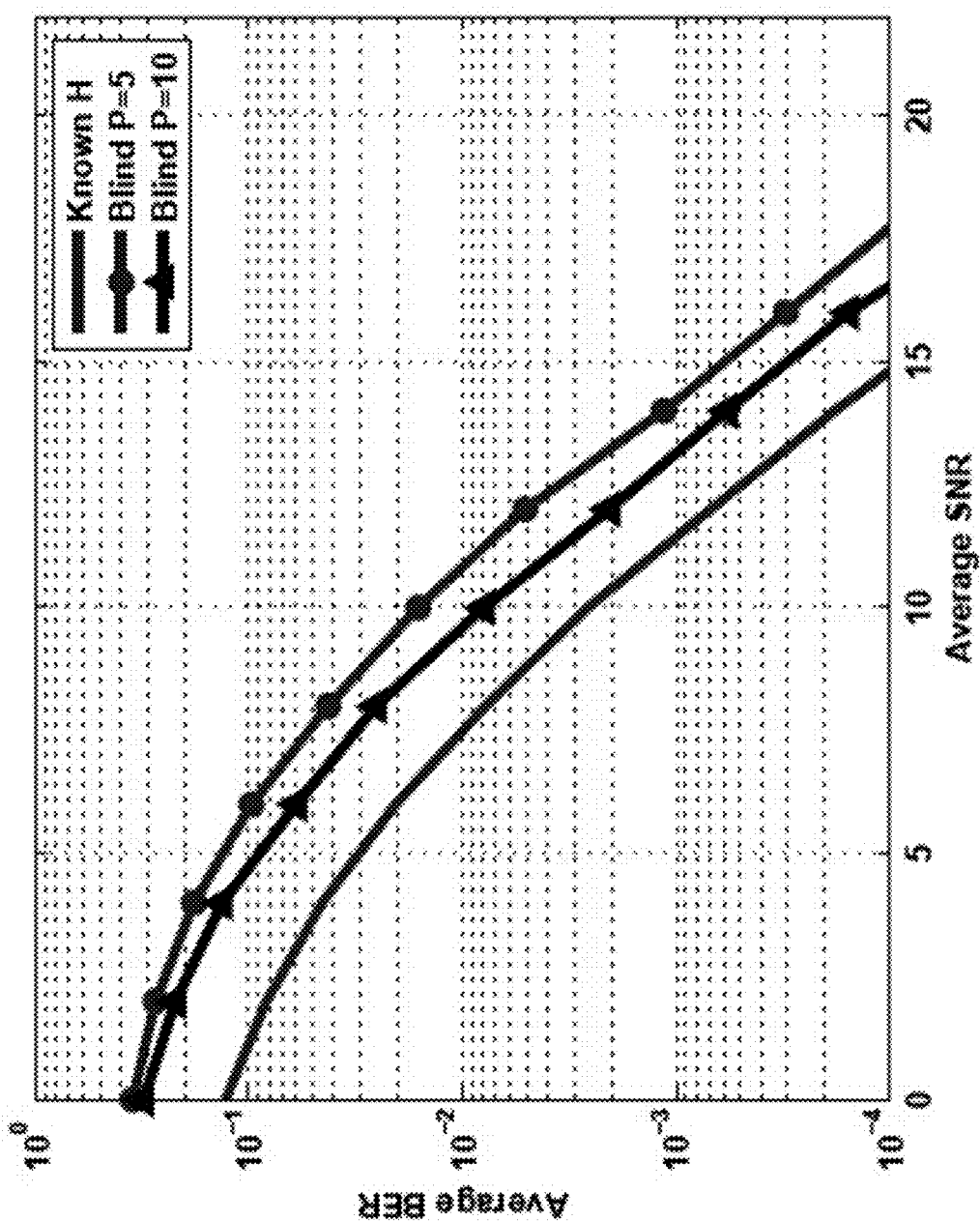
FIG. 10 is a data plot of the performance of a blind MIMO communications system with P=5 and 10 using the ordered BEB algorithm of FIG. 5 at the receiver.

FIG. 10 illustrates a data plot of the performance of a blind MIMO communications system with P=5 and 10 for the ordered BEB algorithm. The performance results for a MIMO communications system with a perfectly known communications channel are also shown for comparative purposes. As shown in FIG. 10, the performance results of the scenario with longer received data blocks yield performance closer to the MIMO communications system with the perfectly known communications channel.

The performance of the joint block differential MIMO communications system and the blind MIMO communications system show similar behavior as the average SNR increases (decreased BER). Furthermore, with both the joint block differential MIMO communications system and the blind MIMO communications system, the performance with longer received data blocks yield performance closer to the MIMO communications system with the perfectly known communications system.

Figure 11:
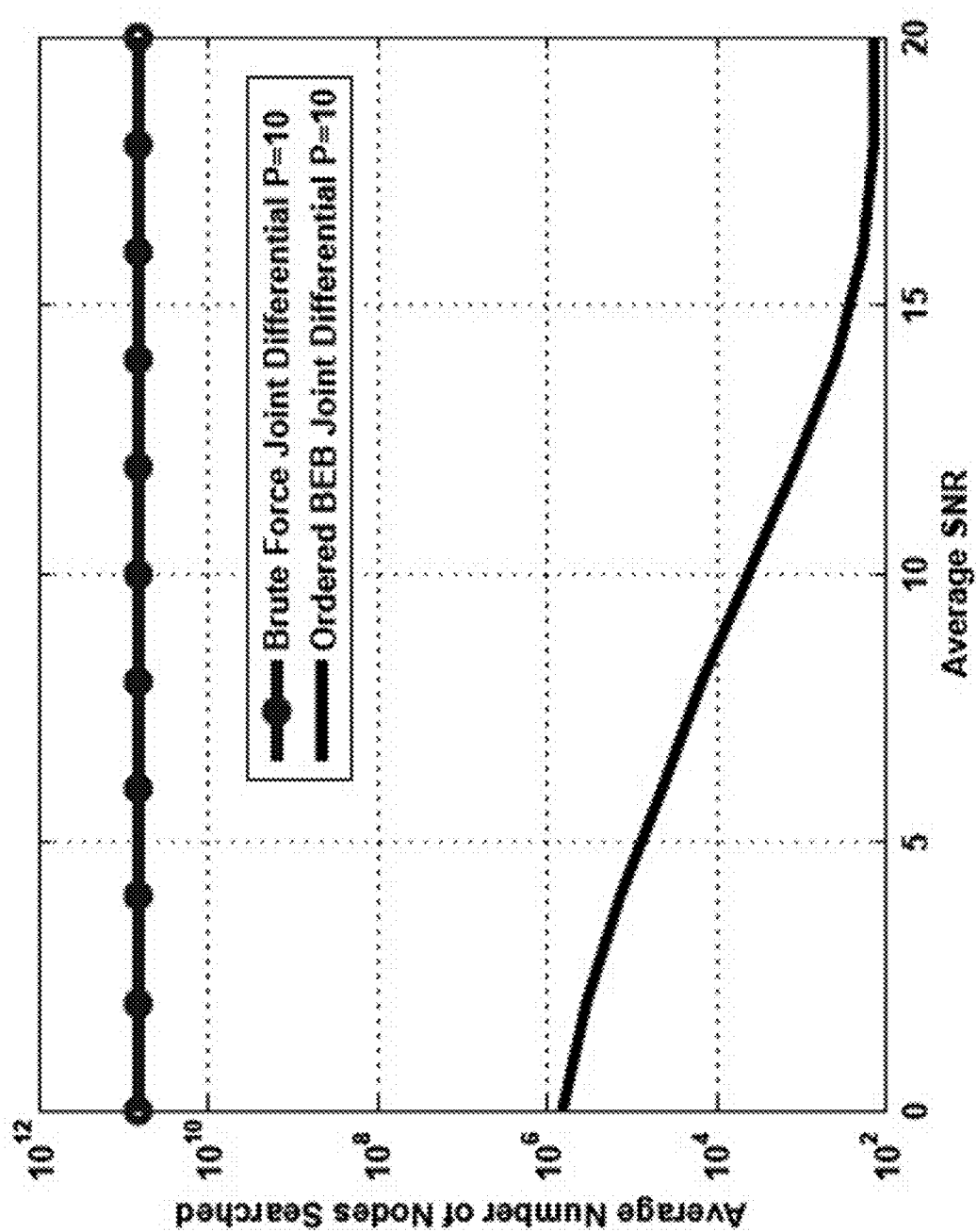
FIG. 11 is a data plot of computational complexity versus average SNR for a joint differential MIMO communications system with P=10 for the ordered BEB algorithm of FIG. 6 compared to brute force search complexity.
Figure 12:
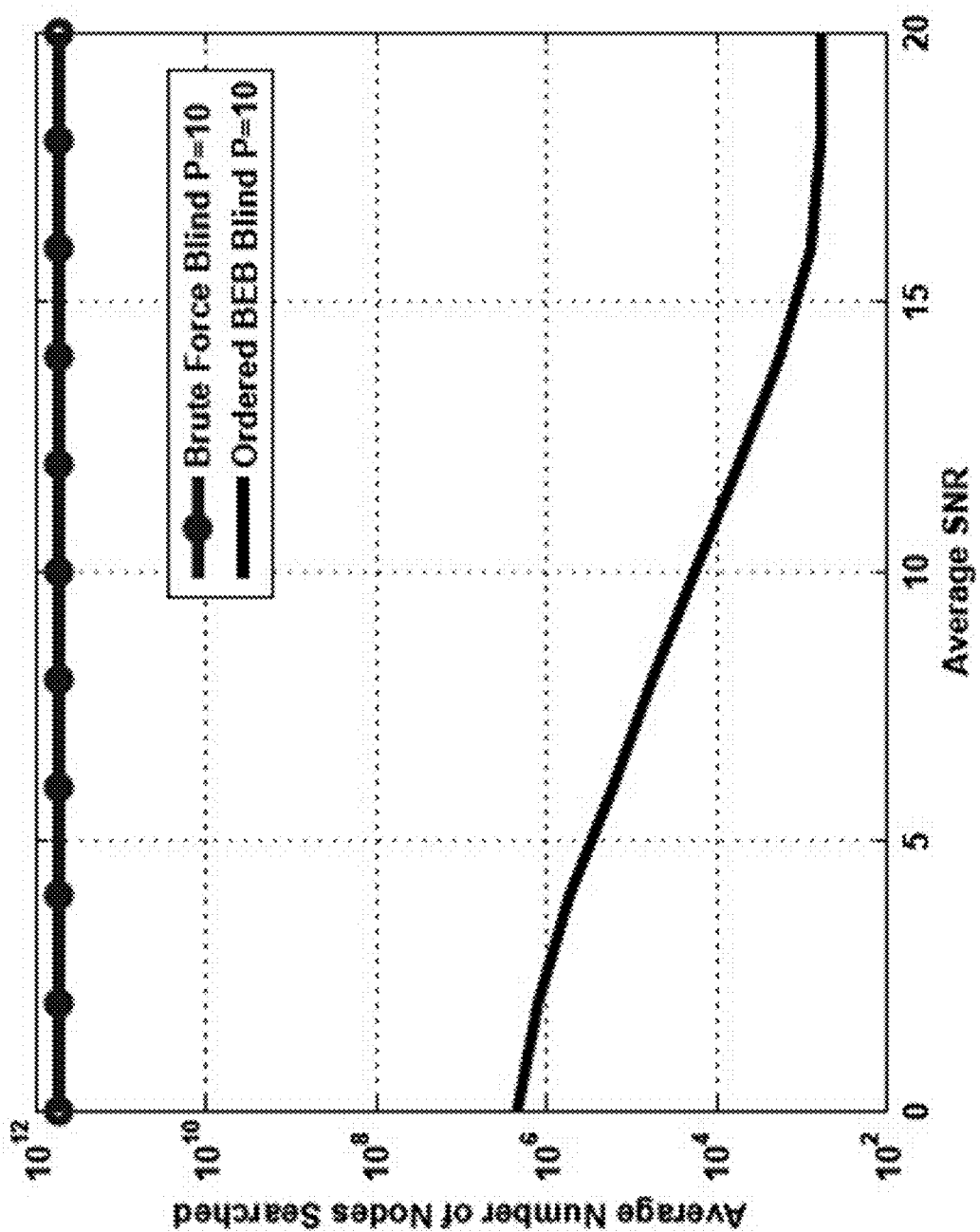
FIG. 12 is a data plot of computational complexity versus average SNR for a blind MIMO detection communications system with P=10 for the ordered BEB algorithm of FIG. 5 compared to brute force search complexity.

FIGS. 11 and 12 illustrate data plots of computational complexity versus average SNR for a joint differential MIMO communications system with P=10 for the ordered BEB algorithm and a blind MIMO detection communications system with P=10 for the ordered BEB algorithm, respectively. Also shown in FIGS. 11 and 12 are computational complexity for a brute force (exhaustive) search algorithm. As shown in FIGS. 11 and 12, the computational complexity of the ordered BEB algorithm is significantly less than that of the brute force algorithm, especially for high average SNR scenarios.

Figure 13:
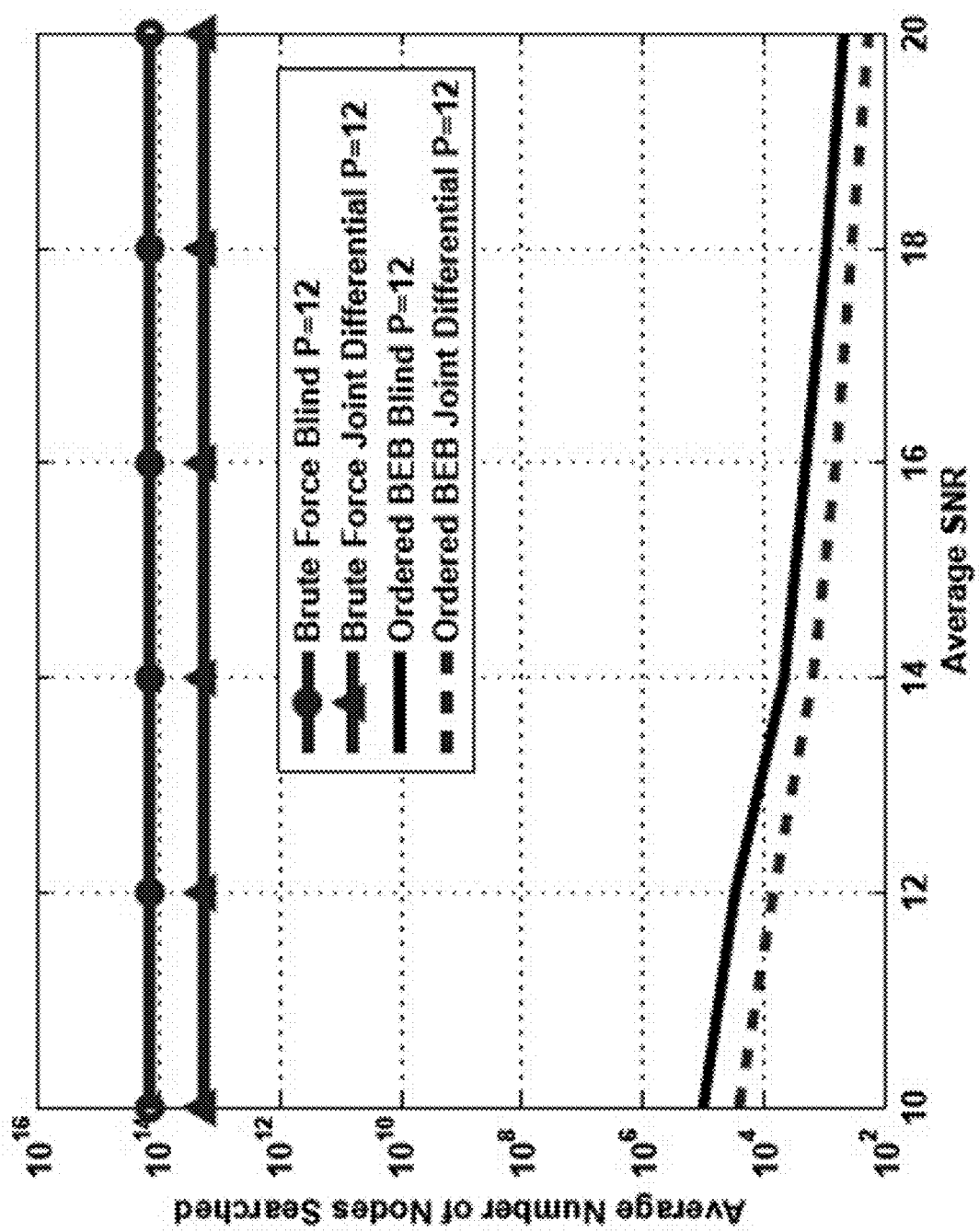
FIG. 13 is a data plot of computation complexity versus average SNR for both a joint differential MIMO communications system with P=12 using the ordered BEB algorithm in FIG. 6 and a blind MIMO communications system with P=12 using the ordered BEB algorithm in FIG. 5 compared to brute force search complexity.

FIG. 13 illustrates a data plot of computation complexity versus average SNR for both a joint differential MIMO communications system with P=12 for the ordered BEB algorithm and a blind MIMO communications system with P=12 for the ordered BEB algorithm. Also shown are computational complexities for brute force search algorithm with P=12.

Figure 14:
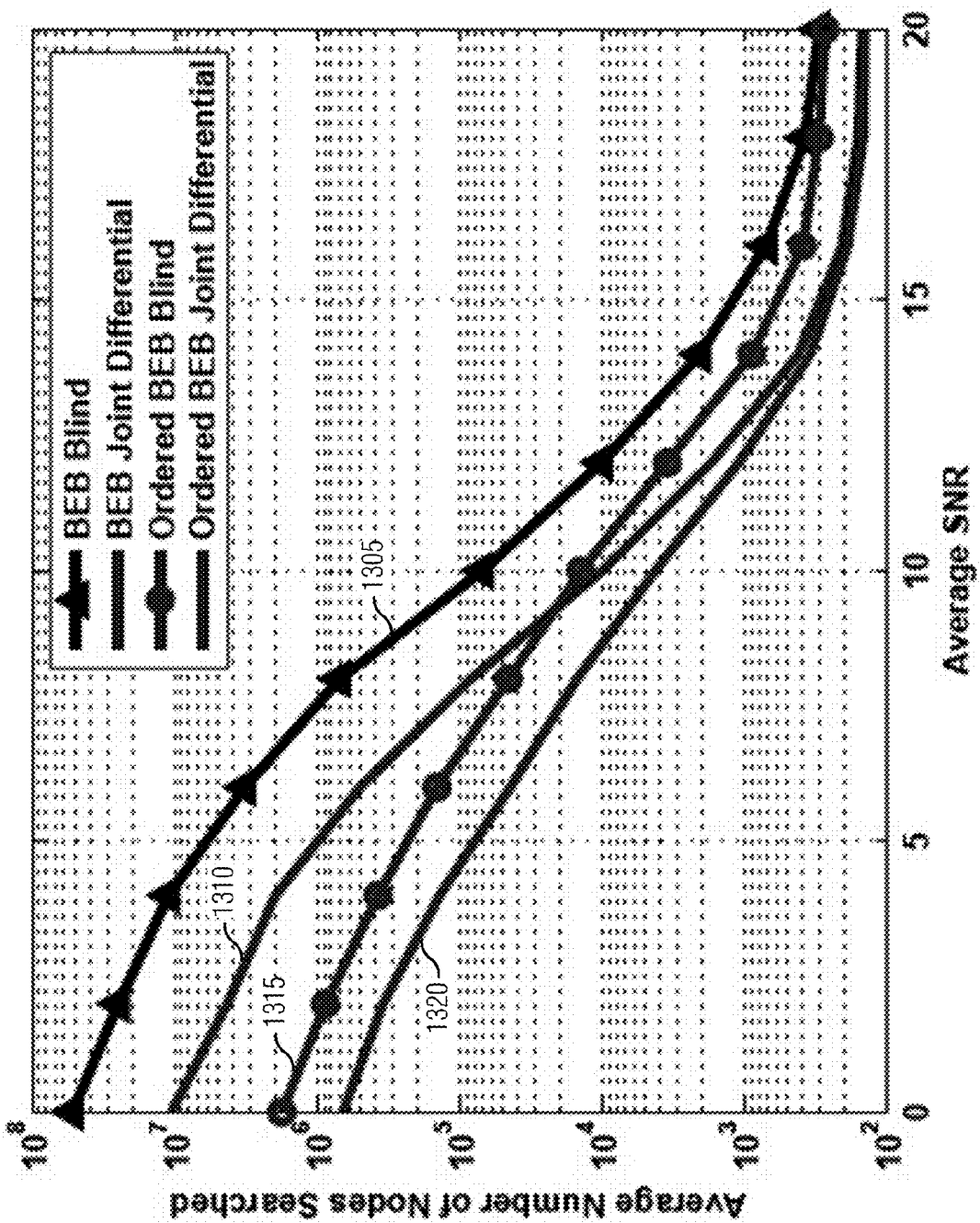
FIG. 14 is a data plot of computational complexity versus average SNR for a joint differential MIMO communications system and a blind MIMO communications system using modified versions of the BEB algorithm presented in the embodiments.

FIG. 14 illustrates a data plot of computational complexity versus average SNR for a joint differential MIMO communications system and a blind MIMO communications system. A first trace 1305 represents the performance of a blind MIMO communications system using the modified BEB algorithm in FIG. 3, a second trace 1310 represents the performance of a joint differential MIMO communications system using the modified BEB algorithm in FIG. 4, a third trace 1315 represents the performance of a blind MIMO communications system using the ordered BEB algorithm FIG. 7, and a fourth trace 1320 represents the performance of a joint differential MIMO communications system using the ordered BEB algorithm FIG. 6. As shown in FIG. 14, the low average SNR performance of the ordered BEB algorithms for both types of MIMO communications system is significantly better than the low SNR performance of the modified BEB algorithms. As average SNR increases, the performance of all the different algorithms converge.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for receiver operation, the method comprising:
a) receiving a data block from a transmitter and ordering the data block, the data block comprising P matrices, where P is a positive integer;
b) determining whether or not operating conditions are met;
c) in response to determining that operating conditions are not met,
c1) computing a test position, wherein the test position comprises a matrix index to a matrix in the data block and a codeword index to a codeword in a set of codewords associated with the matrix corresponding to the matrix index,
c2) selecting a codeword based on the test position, and
c3) computing a metric based on matrices of the data block corresponding to matrix indices less than or equal to the matrix index and a solution set of codewords selected for matrices of the data block corresponding to matrix indices less than or equal to the matrix index,
c4) if the metric is greater than an error constraint, repeating the steps b) and c), and
c5) if the metric is not greater than the error constraint,
c5a) if all test positions have been evaluated,
saving a codeword indexed by the codeword index in the solution set,
updating the error constraint, and
repeating the steps b) and c), and
c5b) if not all test positions have been evaluated,
updating the matrix index to a next matrix, and
repeating the steps b) and c); and
d) in response to determining that operating conditions are met,
outputting the solution set, and
processing the outputted solution set.

2. The method of claim 1, wherein the data block is ordered based on a Frobenius norm of the P matrices.

3. The method of claim 1, wherein all P−1 matrices of the data block except a first matrix of the data block are ordered.

4. The method of claim 1, wherein the receiver uses blind multiple input, multiple output detection, and wherein the method further comprises, adjusting a detection matrix of the data block, wherein the detection matrix of the data block comprises data usable for blind detection.

5. The method of claim 1, wherein updating the error constraint comprises setting the error constraint equal to the metric.

6. The method of claim 1, wherein the outputting the solution set and the processing the outputted solution set are performed if the solution set is not empty.

7. A method for receiver operation, the method comprising:
a) receiving a data block from a transmitter, the data block comprising P matrices, where P is a positive integer;
b) determining whether or not operating conditions are met, wherein determining whether or not operating conditions are met comprises:
b1) if a codeword index is less than a number of codewords in a set of codewords, setting the operating conditions to not met; and
b2) if the codeword index is equal to a number of codewords in the set of codewords,
b2a) if there are untested codewords corresponding to matrix indices less than a matrix index,
updating the matrix index with a largest matrix index with untested codewords less than the matrix index, updating the codeword index corresponding to the updated matrix index,
resetting the codeword index corresponding to all matrix indices larger than the updated matrix index, and
setting the operating conditions to not met, and
b2b) if there are no untested codewords corresponding to matrix indices smaller than the matrix index,
if a solution set is not empty, setting the operating conditions to met, and
if the solution set is empty, relaxing an error constraint, setting the operating conditions to not met, and resetting a test position;
c) in response to determining that operating conditions are not met,
c1) computing the test position, wherein the test position comprises the matrix index to a matrix in the data block and the codeword index to a codeword in the set of codewords associated with the matrix corresponding to the matrix index,
c2) selecting a codeword based on the test position, and
c3) computing a metric based on matrices of the data block corresponding to matrix indices less than or equal to the matrix index and a solution set of codewords selected for matrices of the data block corresponding to matrix indices less than or equal to the matrix index,
c4) if the metric is greater than the error constraint, repeating the steps b) and c), and
c5) if the metric is not greater than the error constraint,
c5a) if all test positions have been evaluated,
saving the codeword indexed by the codeword index in the solution set,
updating the error constraint, and
repeating the steps b) and c), and
c5b) if not all test positions have been evaluated, updating the matrix index to a next matrix, and repeating the steps b) and c); and
d) in response to determining that operating conditions are met,
outputting the solution set, and
processing the outputted solution set.

8. The method of claim 7, wherein relaxing the error constraint comprises increasing the error constraint.

9. The method of claim 8, wherein the error constraint is doubled.

10. The method of claim 7, the relaxing the error constraint, the setting the operating conditions to not met, and the resetting the test position are performed if exit conditions are not met.

11. The method of claim 10, wherein if the solution set is empty further comprises if exit conditions are met, issuing a re-transmit request to a source of the data block in response to determining that received data block detection has failed, wherein determining that received data block detection comprises determining that a maximum detection time has been exceeded, determining that the error constraint is greater than a maximum error constraint, or determining that a number of times the error constraint has been relaxed exceeds a threshold.

12. A method for receiver operation, the method comprising:
a) receiving a data block from a transmitter, the data block comprising P matrices, where P is a positive integer;
b) determining whether or not operating conditions are met;
c) in response to determining that operating conditions are not met,
c1) computing a test position, wherein the test position comprises a matrix index to a matrix in the data block and a codeword index to a codeword in a set of codewords associated with the matrix corresponding to the matrix index,
c2) selecting a codeword based on the test position, and
c3) computing a metric based on matrices of the data block corresponding to matrix indices less than or equal to the matrix index and a solution set of codewords selected for matrices of the data block corresponding to matrix indices less than or equal to the matrix index,
c4) if the metric is greater than an error constraint, repeating the steps b) and c), and
c5) if the metric is not greater than the error constraint,
c5a) if all test positions have been evaluated,
saving a codeword indexed by the codeword index in the solution set,
updating the error constraint, and
repeating the steps b) and c), and
c5b) if not all test positions have been evaluated, updating the matrix index to a next matrix, and repeating the steps b) and c); and
d) in response to determining that operating conditions are met,
outputting the solution set, and
processing the outputted solution set,
wherein the method further comprises adjusting a detection matrix of the data block, wherein the receiver uses blind multiple input, multiple output detection,
wherein the detection matrix of the data block comprises data usable for blind detection, and
wherein adjusting the detection matrix comprises pre-multiplying the detection matrix with a unitary matrix.

13. A method for receiver operation, the method comprising:
a) receiving a data block from a transmitter, the data block comprising P matrices, where P is a positive integer;
b) determining whether or not operating conditions are met;
c) in response to determining that operating conditions are not met,
c1) computing a test position, wherein the test position comprises a matrix index to a matrix in the data block and a codeword index to a codeword in a set of codewords associated with the matrix corresponding to the matrix index,
c2) selecting a codeword based on the test position, and
c3) computing a metric based on matrices of the data block corresponding to matrix indices less than or equal to the matrix index and a solution set of codewords selected for matrices of the data block corresponding to matrix indices less than or equal to the matrix index, wherein the metric comprises a least square error,
c4) if the metric is greater than an error constraint, repeating the steps b) and c), and
c5) if the metric is not greater than the error constraint,
c5a) if all test positions have been evaluated,
saving a codeword indexed by the codeword index in the solution set,
updating the error constraint, and
repeating the steps b) and c), and
c5b) if not all test positions have been evaluated, updating the matrix index to a next matrix, and repeating the steps b) and c); and d) in response to determining that operating conditions are met,
outputting the solution set, and
processing the outputted solution set.

14. A method for receiver operation, the method comprising:
   a) receiving a data block comprising a plurality of matrices from a transmitter, and ordering the data block after receiving the data block;
   b) determining whether or not operating conditions are met;
   c) in response to determining that operating conditions are not met,
      c1) computing a level index to a matrix in the data block and a leaf index to a codeword in a set of codewords, wherein the leaf index is associated with the level index,
      c2) selecting a codeword based on the level index and the leaf index,
      c3) computing a metric based on matrices of the data block corresponding to level indices lower than and equal to the level index and a solution set of codewords for matrices of the data block corresponding to level indices lower than and equal to the matrix index,
      c4) if the metric is greater than an error constraint, repeating the steps b) and c), and
      c5) if the metric is not greater than the error constraint,
         c5a) if all matrices have been evaluated,
            saving a codeword corresponding to the leaf index associated with the level index in the solution set,
            updating the error constraint, and
            repeating the steps b) and c), and
         c5b) if not all matrices have been evaluated,
            updating the level index, and
            repeating the steps b) and c); and
   d) in response to determining that operating conditions are met,
      outputting the solution set, and
      processing the outputted solution set.

15. The method of claim 14, wherein processing the outputted solution set comprises reconstructing transmitted information from the outputted solution set.

16. The method of claim 14, wherein determining whether or not operating conditions are met comprises:
   setting the operating conditions to not met; and
   if the level index is equal to a number of codewords in the set of codewords,
      if there is at least one leaf index corresponding to level indices lower than the level index that is less than the number of codewords,
         updating the level index to a highest level index less than the level index with a corresponding leaf index less than the number of codewords, and
         updating the leaf index corresponding to the updated level index, and
      if there are no leaf indices corresponding to level indices lower than the level index that is less than the number of codewords,
         if the solution set is not empty, setting the operating conditions to met, and
         if the solution set is empty,
            relaxing the error constraint, and
            resetting the level index and the leaf index.

17. A receiver comprising:
   a plurality of receive antennas;
   a plurality of receive circuits, each receive circuit coupled to a receive antenna;
   a detector coupled to the plurality of receive circuits, the detector configured to detect codewords present in a block of received data comprising a plurality of matrices provided by the plurality of receive circuits over plurality of transmission intervals by choosing a best codeword out of a set of codewords for each matrix in the block of received data based on an adjustable error constraint, wherein the adjustable error constraint is relaxed or tightened based on a quality of codewords chosen, wherein the detector is configured to backtrack to previously evaluated matrices if not all codewords in the set of codeword for each matrix have been tested, and wherein the detector comprises:
      a metric compute unit configured to compute a metric based on a selected set of matrices and a corresponding set of codewords being tested;
      an operating condition unit coupled to the metric compute unit, the operating condition unit configured to select a matrix and a codeword based on the selected matrix, the codeword being tested, the metric, and the adjustable error constraint; and
      an ordering unit coupled to the metric compute unit, the ordering unit configured to order the matrices of the block of received data based on a norm of the matrices; and
   a decoder coupled to the detector, the decoder configured to reconstruct transmitted data from the codewords detected in the block of received data.

18. The receiver of claim 17, wherein the receiver further comprises a memory to store a matrix index that points to the selected matrix and a plurality of codeword indices, wherein each codeword index is associated with a matrix in the block of received data, and wherein each codeword index points to a codeword being tested.

19. The receiver of claim 17, wherein the metric compute unit computes a least square error between the selected set of matrices and the corresponding set of codewords being tested.

* * * * *